United States Patent
Shimada

(10) Patent No.: US 9,942,476 B2
(45) Date of Patent: Apr. 10, 2018

(54) IMAGE CAPTURING APPARATUS AND IMAGE CAPTURING METHOD

(75) Inventor: Junji Shimada, Tokyo (JP)

(73) Assignee: SONY CORPORATION, Tokyo (JP)

( * ) Notice: Subject to any disclaimer, the term of this patent is extended or adjusted under 35 U.S.C. 154(b) by 642 days.

(21) Appl. No.: 13/202,000

(22) PCT Filed: Feb. 16, 2010

(86) PCT No.: PCT/JP2010/052241
§ 371 (c)(1),
(2), (4) Date: Aug. 17, 2011

(87) PCT Pub. No.: WO2010/098228
PCT Pub. Date: Sep. 2, 2010

(65) Prior Publication Data
US 2011/0298888 A1    Dec. 8, 2011

(30) Foreign Application Priority Data

Feb. 27, 2009   (JP) ................ P2009-045495

(51) Int. Cl.
*H04N 7/00* (2011.01)
*H04N 5/232* (2006.01)
*G03B 37/00* (2006.01)
*H04N 101/00* (2006.01)

(52) U.S. Cl.
CPC ......... *H04N 5/23248* (2013.01); *G03B 37/00* (2013.01); *H04N 5/232* (2013.01); *H04N 5/23238* (2013.01); *H04N 5/23287* (2013.01); *H04N 5/23293* (2013.01); *H04N 2101/00* (2013.01)

(58) Field of Classification Search
CPC ........ G02B 27/646; G03B 37/02; G03B 5/00; H04N 5/23287
See application file for complete search history.

(56) References Cited

U.S. PATENT DOCUMENTS

| | | | |
|---|---|---|---|
| 6,192,196 B1 * | 2/2001 | Keller | 396/20 |
| 6,639,596 B1 * | 10/2003 | Shum et al. | 345/427 |
| 2004/0017470 A1 * | 1/2004 | Hama et al. | 348/42 |
| 2005/0270385 A1 * | 12/2005 | Shioya et al. | 348/239 |

FOREIGN PATENT DOCUMENTS

| | | |
|---|---|---|
| JP | 11-088754 A | 3/1999 |
| JP | 2000-184265 A | 6/2000 |
| JP | 2001-285702 A | 10/2001 |
| JP | 2007-214620 A | 8/2007 |
| JP | 2008-271529 A | 11/2008 |

* cited by examiner

*Primary Examiner* — Zhubing Ren
(74) *Attorney, Agent, or Firm* — Chip Law Group

(57) ABSTRACT

A panoramic image is to be easily generated.
A driver 12 displaces at least one of a lens unit 11a and an image capturing element 21 with respect to an optical axis. A control unit 50 displaces, using the driver 12, at least one of the lens unit 11a and the image capturing element 21 in accordance with a motion of an image capturing apparatus 10. When generating a plurality of captured images while shifting an image capturing direction in order to generate a panoramic image from the plurality of captured images, the control unit 50 changes a position of the lens unit 11a and/or the image capturing element 21, the position being a position at the start of exposure of each of the captured images, in a direction set according to a direction in which the image capturing direction shifts, thereby performing correction of deviation caused by a motion of the image capturing apparatus.

27 Claims, 17 Drawing Sheets

FIG. 6
(A) 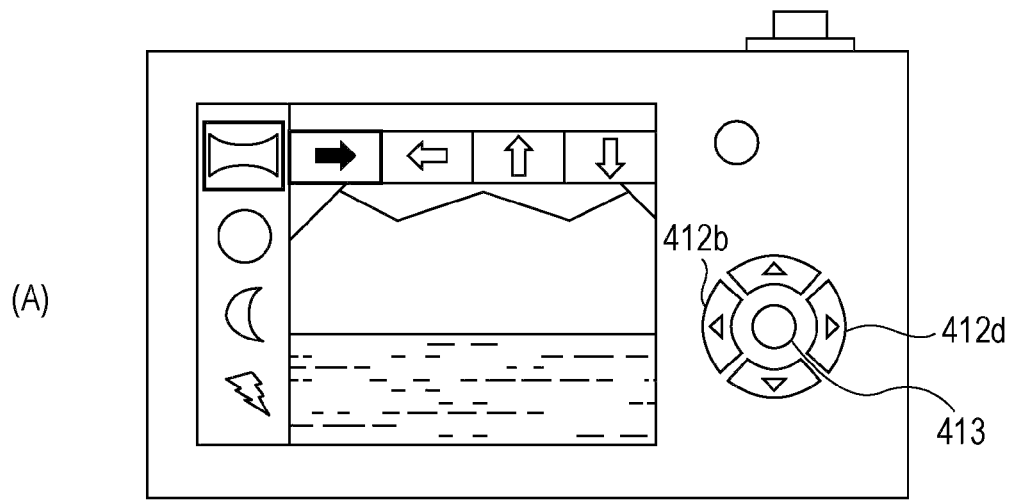
(B) 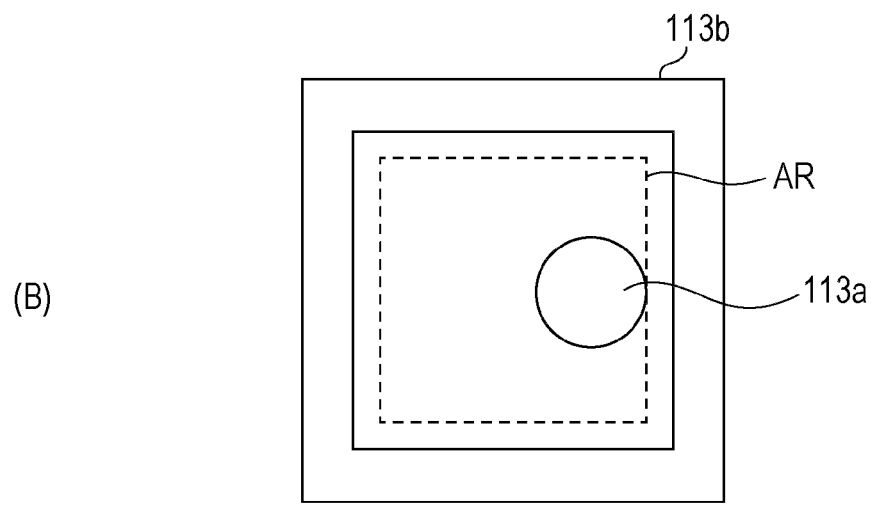

FIG. 7
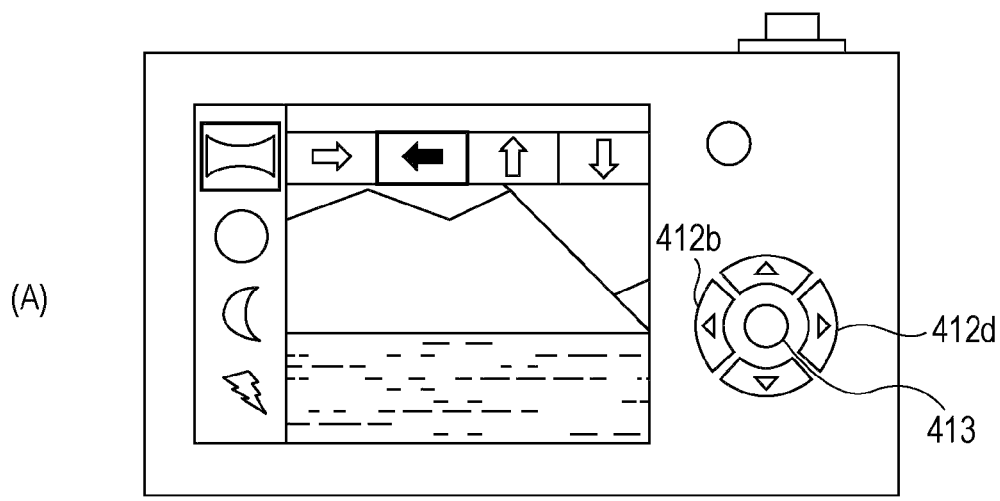
(A)
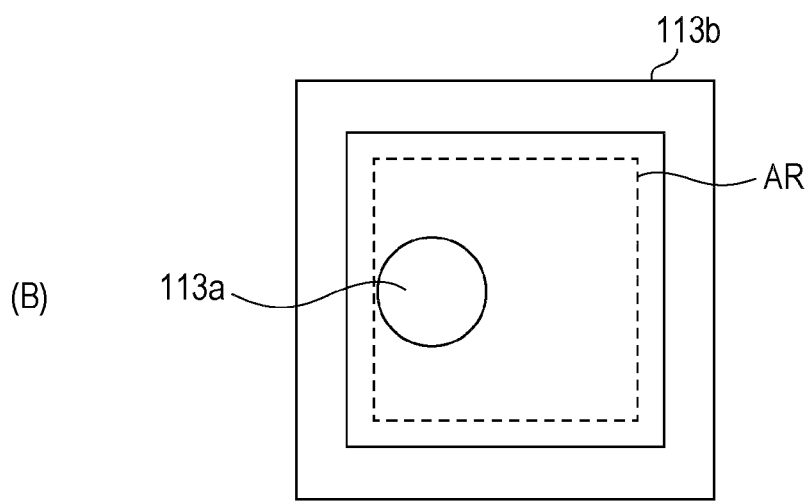
(B)

FIG. 8
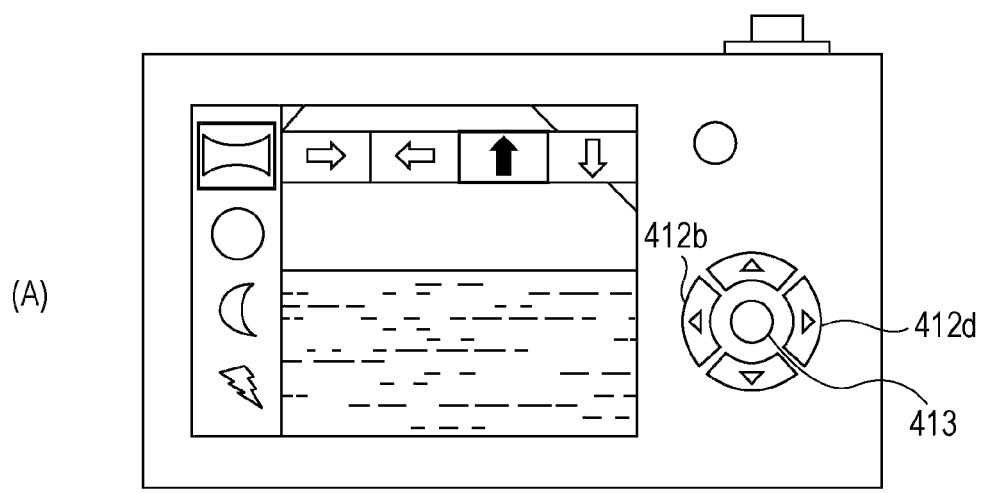
(A)
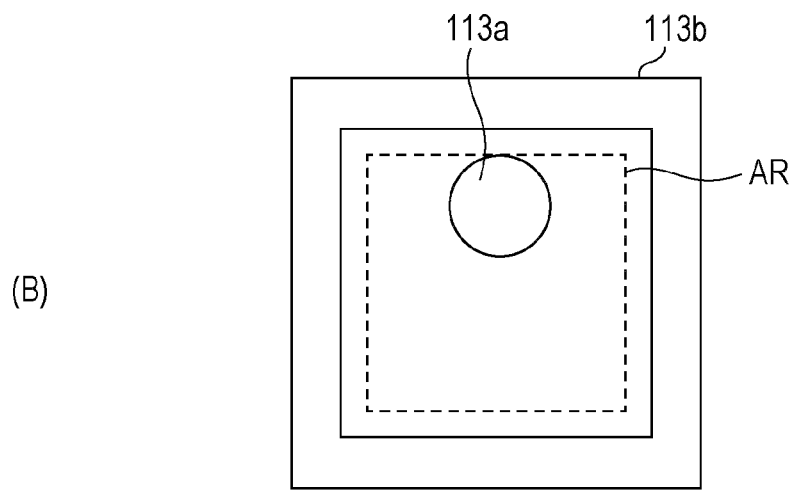
(B)

FIG. 9
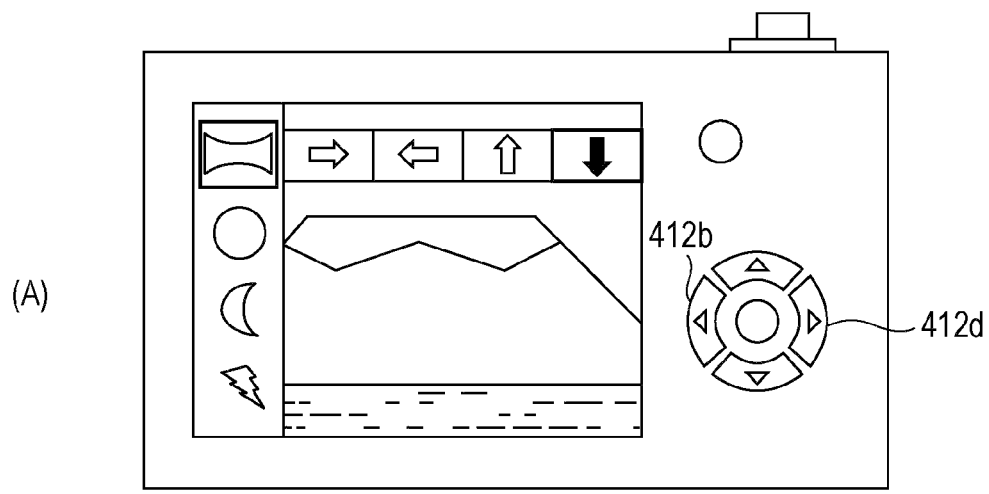
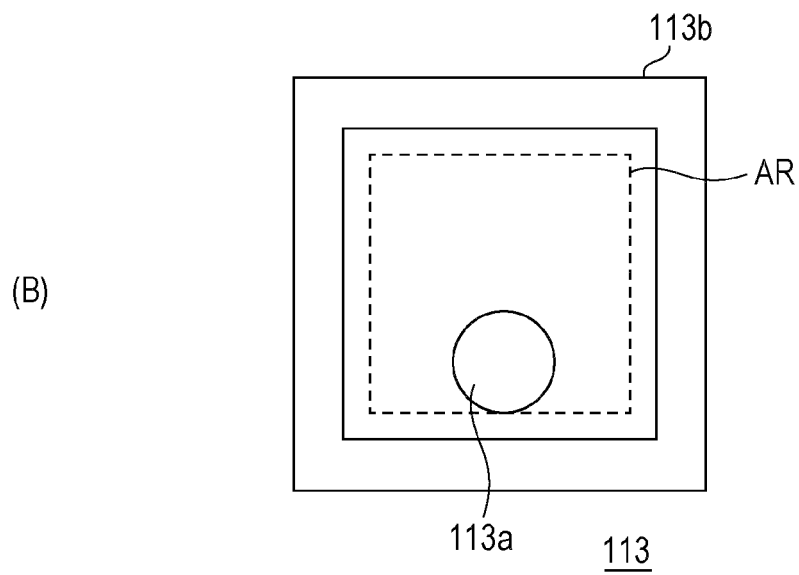

FIG. 10
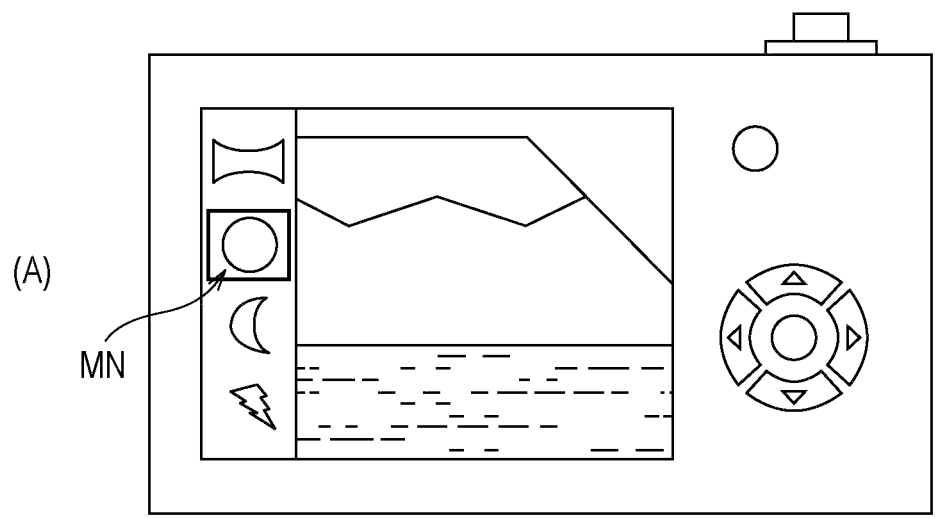
(A)
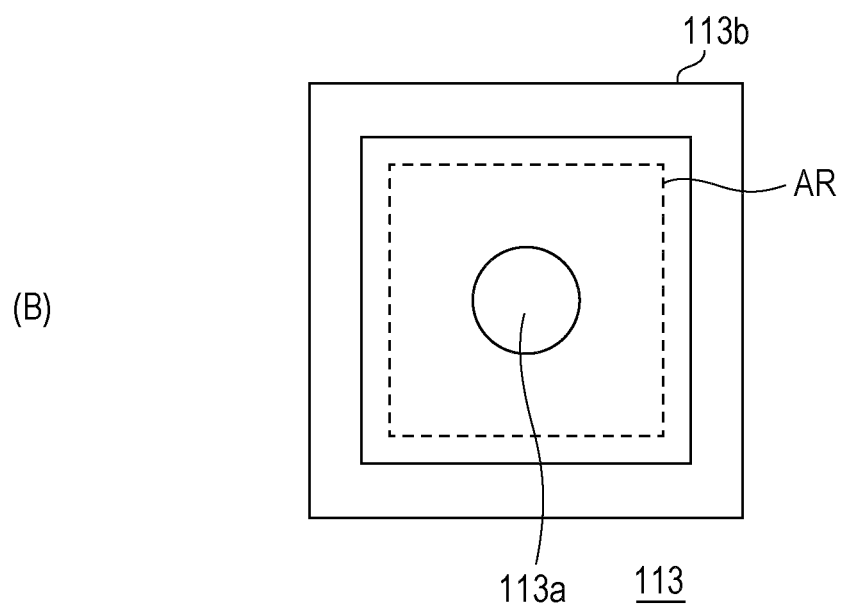
(B)

FIG. 12
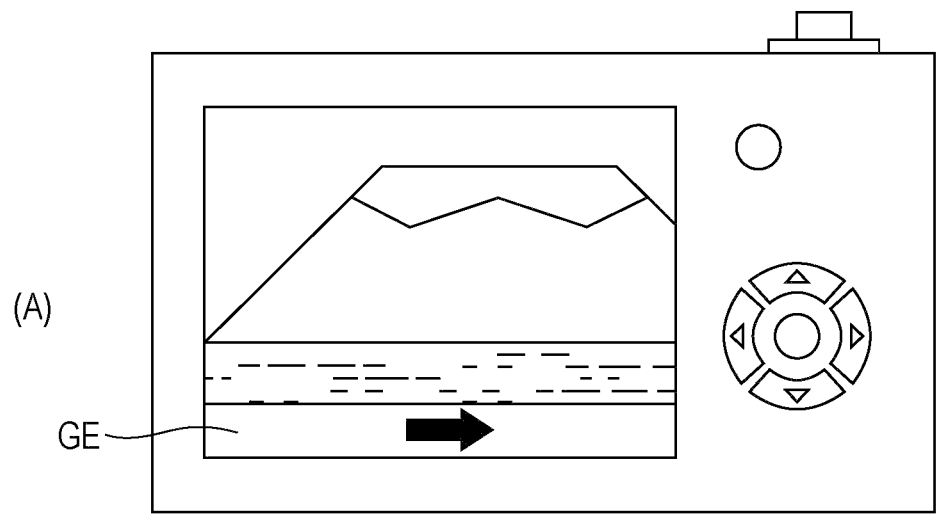
(A)
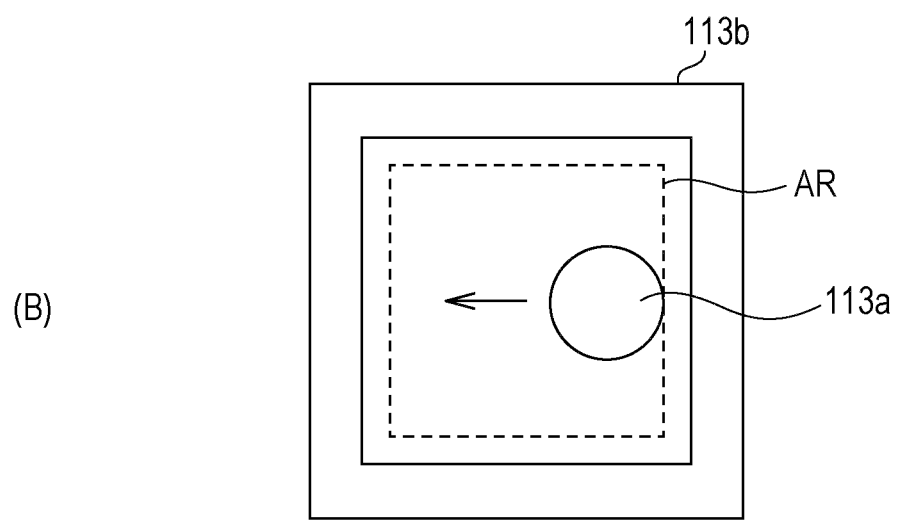
(B)

IMAGE CAPTURING APPARATUS AND IMAGE CAPTURING METHOD

CROSS-REFERENCES TO RELATED APPLICATIONS

The present application is a national phase entry under 35 U.S.C. § 371 of International Application No. PCT/JP2010/052241 filed Feb. 16, 2010, published on Sep. 2, 2010 as WO 2010/098228 A2, which claims priority from Japanese Patent Application No. JP 2009-045495 filed in the Japanese Patent Office on Feb. 27, 2009.

TECHNICAL FIELD

The present invention relates to image capturing apparatuses and image capturing methods. Specifically, the present invention is directed to easily obtaining a plurality of captured images for generating a panoramic image.

BACKGROUND ART

Conventionally, in order to obtain a panoramic image using an image capturing apparatus, for example, image capturing is performed while shifting an image capturing region little by little, and frame (or field) images are sequentially recorded from an image capturing start point, as in PTL 1. Then, an overlap portion of the captured images that are positionally adjacent to each other is extracted from the recorded captured images, and a certain calculation is performed on this overlap portion, so that the individual captured images are seamlessly combined and a panoramic image is generated.

For example, a user performs image capturing while shifting an image capturing direction in a horizontal direction, and records a plurality of captured images. By seamlessly combining the captured images while performing an appropriate process on an overlap portion of the captured images, a horizontally long panoramic image can be obtained.

Also, during image capturing, an optical axis variable element is changed in a direction opposite to a shift direction of an image capturing direction, and an operation of opening a shutter while an optical axis is linearly moving and quickly returning the optical axis to an original position while the shutter is closed is repeated, whereby a plurality of captured images are recorded. In this way, the resolution does not degrade even if the image capturing apparatus is quickly moved, and a favorable panoramic image can be generated even if a shutter speed is not high.

CITATION LIST

Patent Literature

PTL 1: Japanese Unexamined Patent Application Publication No. 11-88754

SUMMARY OF INVENTION

Technical Problem

Meanwhile, image capturing apparatuses are provided with a hand shake correction function for preventing an image blur caused by a hand shake by shifting an optical axis in accordance with the hand shake. However, the hand shake correction function is a function for preventing an image blur caused by a hand shake and is not a function for generating captured images used for a panoramic image.

Accordingly, an object is to provide an image capturing apparatus and an image capturing method that are capable of easily obtaining a plurality of captured images for generating a panoramic image.

Solution to Problem

A first aspect of the present invention resides in an image capturing apparatus including a drive unit that displaces at least one of a lens unit and an image capturing element with respect to an optical axis, and a control unit that displaces, using the drive unit, at least one of the lens unit and the image capturing element in accordance with a motion of the image capturing apparatus. When generating a plurality of captured images while shifting an image capturing direction in order to generate a panoramic image from the plurality of captured images, the control unit changes a position of the lens unit and/or the image capturing element, the position being a position at the start of exposure of each of the captured images, in a direction set according to a direction in which the image capturing direction shifts.

In the present invention, in the case of generating a plurality of captured images while shifting an image capturing direction in order to generate a panoramic image from the plurality of captured images, at least one of the lens unit and the image capturing element is displaced in a direction set according to a direction in which the image capturing direction shifts within a plane vertical to the optical axis from a position at which the optical axis is a center, and the changed position is set as a correction operation start position of deviation correction, so that a deviation correction range expands. Also, the position at the start of exposure is changed in accordance with the change of the correction operation start position, and at least one of the lens unit and the image capturing element is displaced from the position at which the optical axis is a center, and the contraposition is regarded as an exposure start position. Also, during an exposure period, the displaced lens unit and/or the image capturing element is moved in accordance with a motion of the image capturing apparatus, and correction of deviation is performed in accordance with the motion of the image capturing apparatus on an optical image formed on the image capturing surface of the image capturing element. Also, in an image capturing mode different from the image capturing mode for generating a plurality of captured images in order to generate a panoramic image, exposure starts by setting the positions of the lens unit and the image capturing element to the position at which the optical axis is the center.

A second aspect of the present invention resides in an image capturing method including a step of displacing, with a drive unit, at least one of a lens unit and an image capturing element with respect to an optical axis, a step of displacing, with a control unit using the drive unit, at least one of the lens unit and the image capturing element in accordance with a motion of an image capturing apparatus, and a step of changing, with the control unit, when generating a plurality of captured images while shifting an image capturing direction in order to generate a panoramic image from the plurality of captured images, a position of the lens unit and/or the image capturing element, the position being a position at the start of exposure of each of the captured images, in a direction set according to a direction in which the image capturing direction shifts.

Advantageous Effects of Invention

According to the present invention, at least one of a lens unit and an image capturing element is displaced by a drive unit with respect to an optical axis. Also, in the case of generating a plurality of captured images while shifting an image capturing direction in order to generate a panoramic image from the plurality of captured images, a position of the lens unit and/or the image capturing element at the start of exposure of each of the captured images is changed in a direction set according to a direction in which the image capturing direction shifts by a control unit using the drive unit. Furthermore, control of displacing the displaced lens unit and/or the image capturing element in accordance with a motion of the image capturing apparatus using the drive unit is performed by the control unit, so that correction of deviation caused in accordance with a shift of the image capturing direction is performed. Accordingly, deviation correction suitable for generating a panoramic image can be performed, and a plurality of captured images for generating a panoramic image can be easily obtained.

BRIEF DESCRIPTION OF DRAWINGS

FIG. 6 includes diagrams describing a case where a right-direction sweep mode is selected.

FIG. 7 includes diagrams describing a case where a left-direction sweep mode is selected.

FIG. 8 includes diagrams describing a case where an upward-direction sweep mode is selected.

FIG. 9 includes diagrams describing a case where a downward-direction sweep mode is selected.

FIG. 10 includes diagrams describing a case where a normal image capturing mode is selected.

FIG. 12 includes diagrams describing an operation performed when the right-direction sweep mode is set.

DESCRIPTION OF EMBODIMENTS

Hereinafter, embodiments for carrying out the invention will be described. Note that the description will be given in the following order.
1. First embodiment
1-1. Configuration of image capturing apparatus
1-2. Appearance of image capturing apparatus
1-3. Operation of image capturing apparatus
1-4. Example of operation of generating panoramic image (in the case of right-direction sweep mode)
2. Second embodiment
2-1. Configuration of image capturing apparatus
2-2. Configuration of camera platform
2-3. Operation of image capturing apparatus 1. First Embodiment

[1-1. Configuration of Image Capturing Apparatus]

Figure 1:
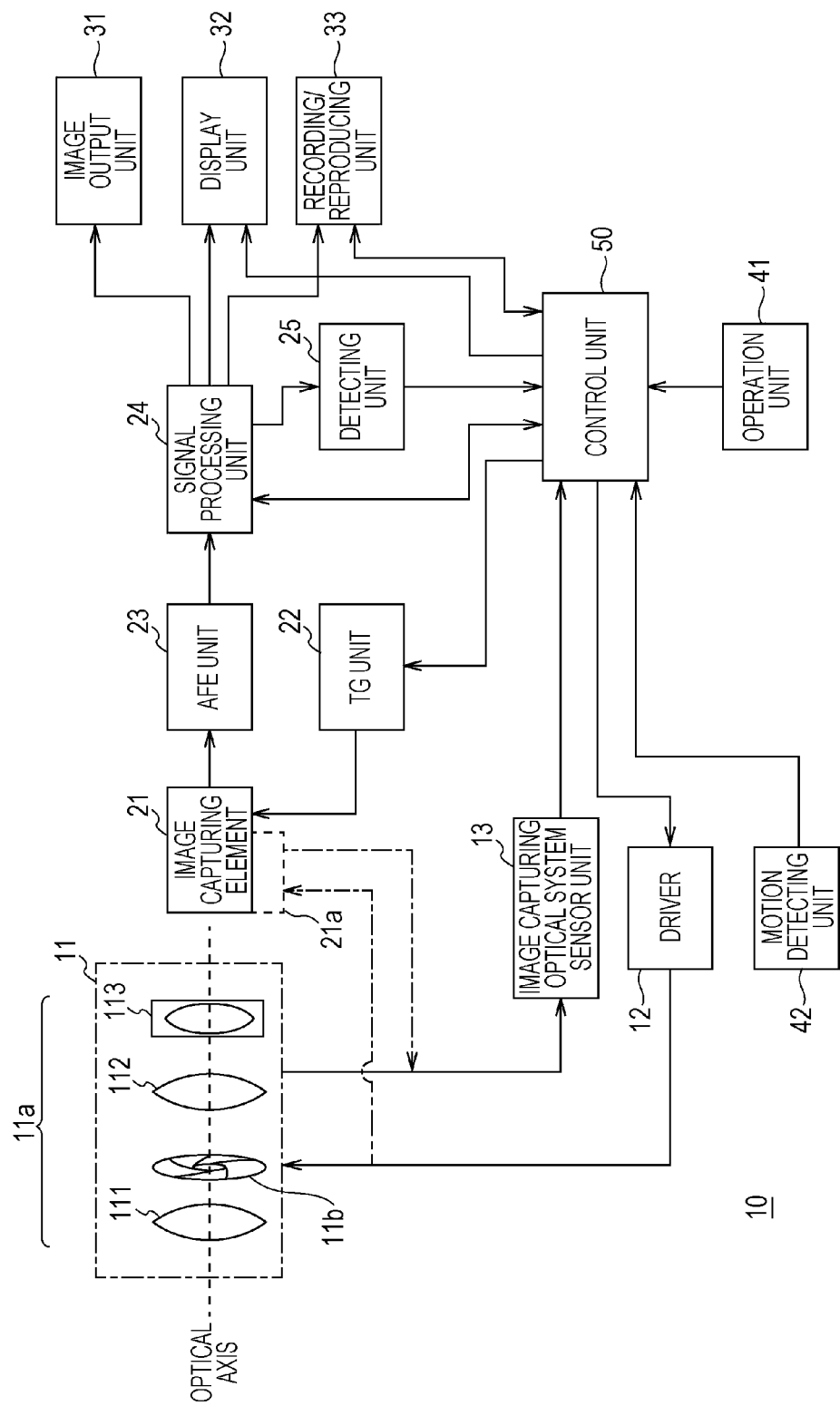
FIG. 1 is a diagram illustrating a configuration of a first embodiment.

FIG. 1 is a diagram illustrating a configuration of a first embodiment. An image capturing apparatus 10 includes an image capturing optical system block 11, a driver 12, an image capturing optical system sensor unit 13, an image capturing element 21, a timing signal generation (TG) unit 22, an analog front-end (AFE) unit 23, a signal processing unit 24, and a detecting unit 25. Furthermore, the image capturing apparatus 10 includes an image output unit 31, a display unit 32, a recording/reproducing unit 33, an operation unit 41, a motion detecting unit 42, and a control unit 50.

The image capturing optical system block 11 includes a lens unit 11a and a diaphragm mechanism 11b for adjusting the amount of light of an optical image that is formed on an image capturing surface of the image capturing element 21. The lens unit 11a is constituted by, for example, a zoom lens 111 that changes magnification, a focus lens 112 that performs focusing, and a correction lens unit 113 that shifts, on the image capturing surface, the position of an optical image that is formed on the image capturing surface of the image capturing element 21, which will be described below.

The correction lens unit 113 is constituted by, for example, a correction lens that is provided so that the optical axis thereof matches the optical axis of the image capturing optical system, and an actuator or the like that moves this correction lens in a direction orthogonal to the optical axis of the image capturing optical system. In the correction lens unit 113 having such a configuration, the correction lens is displaced by the actuator within a plane vertical to the optical axis of the image capturing optical system from a position at which the optical axis is the center.

Also, a variable-angle prism unit may be used for the correction lens unit 113. The variable-angle prism unit is formed by providing a translucent incident end plate and exit end plate on end surfaces of a bendable barrel, such as bellows, and by enclosing a translucent liquid having a desired refractive index in the barrel. In the case of using the variable-angle prism unit, one of the incident end plate and the exit end plate is fixed, and the other is driven by an actuator, thereby forming an optical wedge. In the correction lens unit having such a configuration, the tilt angle of the exit end plate with respect to the incident end plate is changed, thereby shifting, on the image capturing surface, the position of an optical image formed on the image capturing surface.

Furthermore, the lens unit 11a may have another configuration as long as it has a configuration in which an optical image is formed on the image capturing surface and a configuration in which the position of an optical image formed on the image capturing surface can be shifted on the image capturing surface by being displaced within a plane vertical to the optical axis. Thus, the lens unit 11a is not limited to the case of being constituted by the zoom lens 111, the focus lens 112, and the correction lens unit 113.

The driver 12 drives the zoom lens 111, the focus lens 112, and the actuator of the correction lens unit 113 on the basis of a lens control signal supplied from the control unit 50, which will be described below. Also, the driver 12 drives the diaphragm mechanism 11b on the basis of a diaphragm control signal supplied from the control unit 50.

The image capturing optical system sensor unit 13 detects the lens positions of the zoom lens 111 and the focus lens 112, the displacement state of the correction lens unit 113 (equivalent to the displacement position and correction angle of the correction lens unit 113), and the setting position of the diaphragm mechanism 11b, and supplies position signals to the control unit 50.

An image capturing element such as a CCD (Charge Coupled Devices) or a CMOS (Complementary Metal Oxide Semiconductor)-type image sensor is used as the image capturing element 21. The image capturing element 21 converts an optical image formed on the image capturing surface by the image capturing optical system block 11 into an electric signal and outputs it to the AFE unit 23.

The TG unit 22 generates various types of drive pulses that are necessary for performing output of an electric signal representing a captured image by the image capturing element 21, electronic shutter pulses for controlling a charge storage period of the image capturing element 21, etc.

The AFE unit 23 performs a denoising process, for example, a CDS (Correlated Double Sampling) process or an AGC (Automatic Gain Control) process for obtaining an image capturing signal of a desired signal level, on an electric signal (image signal) output from the image capturing element 21. Furthermore, the AFE unit 23 converts an analog image capturing signal on which the denoising process and gain control have been performed into a digital signal, and outputs it to the signal processing unit 24.

The signal processing unit 24 performs camera signal pre-processing, camera signal processing, a resolution conversion process, a compression/decompression process, etc. In the camera signal pre-processing, a defect correction process for correcting a signal of a defective pixel in the image capturing element 21, a shading correction process for correcting light falloff at edges of a lens, etc. are performed on an image signal supplied from the AFE unit 23. In the camera signal processing, a process of adjusting a white balance and correcting brightness is performed. Also, digital cameras and the like may be provided with a color filter array on the front surface of an image capturing element, so that individual signals of red, green, and blue are obtained using a single image capturing element. In such a case, a demosaic process is performed in the camera signal processing, and a signal of a color lacking in each pixel is generated through interpolation using signals of neighboring pixels. In the resolution conversion process, an image signal on which camera signal processing has been performed or an image signal that has been decompressed and decoded is converted into a certain resolution. In the compression/decompression process, an image signal on which camera signal processing has been performed or an image signal on which a resolution conversion process has been performed is compressed and encoded, thereby generating an encoded signal of the JPEG scheme, for example. Also, in the compression/decompression process, an encoded signal of the JPEG scheme is decompressed and decoded. Alternatively, in the compression/decompression process, compression encoding may be performed on an image signal of a still image in a scheme different from the JPEG scheme. Also, in the compression/decompression process, compression encoding may be performed on an image signal of a moving image using a moving image compression scheme.

Furthermore, in the case of generating a panoramic image in the image capturing apparatus 10, the signal processing unit 24 calculates motion vectors using captured images, and combines a plurality of captured images using the calculated motion vectors so that the images of the same object overlap, thereby generating a panoramic image. Alternatively, a motion detection signal supplied from a motion detection sensor may be used to combine the captured images. In this case, even if motion vectors are not properly obtained, a plurality of captured images can be combined using the motion detection signal so that the images of the same object overlap. Note that the captured images used for generating a panoramic image are written on a memory (not illustrated) or a recording medium by the recording/reproducing unit 33, which will be described below. Also, generation of a panoramic image may be performed either at the time of image capturing or at the time of reproducing. Also, generation of a panoramic image may be performed by an external apparatus different from the image capturing apparatus 10, for example, a computer or the like. In the case of performing generation of a panoramic image at the time of reproducing or by an external apparatus, identification information that enables generation of a panoramic image at the time of reproducing or by an external apparatus (for example, information representing a series of captured images or information representing image capturing order) is provided in the captured images used for generating a panoramic image. By providing the identification information in this way, the captured images can be combined in the correct order to generate a panoramic image.

The detecting unit 25 performs detections of a brightness level and a focus state of an object using an image capturing signal or the like supplied to the signal processing unit 24, generates a detection signal representing the brightness level and the focus state, and supplies it to the control unit 50.

The image output unit 31 converts an image signal processed by the signal processing unit 24 into an image signal of a format compatible with an external apparatus connected to the image capturing apparatus 10, and outputs it.

The display unit 32 displays an image that is being captured by the image capturing apparatus 10 and a captured image that has been reproduced by the recording/reproducing unit 33. Also, the display unit 32 displays a menu or the like for performing settings of the image capturing apparatus 10.

In the recording/reproducing unit 33, a recording medium, such as a flash memory, an optical disc, or magnetic tape, is used. The recording/reproducing unit 33 records an image signal and an encoded signal of a captured image output from the signal processing unit 24 on the recording medium. Also, the recording/reproducing unit 33 performs a process of reading an image signal recorded on the recording medium and supplying it to the image output unit 31 or the display unit 32, and a process of reading an encoded signal recorded on the recording medium and supplying it to the signal processing unit 24. Note that the recording/reproducing unit 33 is not limited to a configuration from which the recording medium is removable. For example, a hard disk device or the like may be built therein as the recording/reproducing unit 33.

The operation unit 41 is constituted by operation buttons and a touch panel or the like provided on the screen of the display unit 32. The operation unit 41 generates an operation signal in accordance with a user operation and supplies it to the control unit 50.

The motion detecting unit 42 is constituted by using a gyro sensor or the like for detecting a motion of the image capturing apparatus 10. The motion detecting sensor is constituted by a yawing angular velocity detecting sensor that detects, for example, an angular velocity in accordance with deviation in a yawing direction, and a pitching angular velocity detecting sensor that detects, for example, an angular velocity in accordance with deviation in a pitching direction. Also, the motion detecting unit 42 is provided with a processing circuit that performs signal processing on a detection signal. In the processing circuit, an unnecessary signal component, for example, a noise component, a frequency component higher than a signal component of an angular velocity value, a resonance frequency component, or the like, is removed from a detection signal. Furthermore, in the processing circuit, correction of a drift that occurs in accordance with a change of temperature or change of time, a process of converting a detection signal into a digital signal and supplying it to the control unit 50, etc. are performed. In a case where a detection signal is output as an analog signal from the motion detecting unit 42, the control unit 50 may have a configuration of converting the motion detection signal into a digital signal before using it.

Note that the motion detecting unit 42 is not limited to the case of being configured using an angular velocity detecting sensor. For example, detection of a motion may be performed using an acceleration detecting sensor or the like. In the case of using the acceleration detecting sensor, a velocity can be calculated by integrating the output of the acceleration detecting sensor. Furthermore, a motion can be calculated by integrating the velocity.

The control unit 50 is constituted by a CPU (Central Processing Unit), a memory, etc. A program executed by the CPU and various types of data are stored in the memory. As this memory, a nonvolatile memory such as an EEPROM (Electrically Erasable and Programmable ROM) or a flash memory is used, for example. The CPU of the control unit 50 executes the program stored in the memory, and controls the individual units on the basis of the various types of data stored in the memory or an operation signal supplied from the operation unit 41 so that the image capturing apparatus 10 operates in accordance with a user operation. For example, when a user performs a shutter operation, the control unit 50 controls the operation of the TG unit 22 and so forth, thereby causing an encoded signal or the like of a still image captured at a desired shutter speed to be recorded on the recording medium of the recording/reproducing unit 33. Also, when an operation of starting recording of a moving image is performed, the control unit 50 causes an encoded signal or the like of the moving image to be recorded on the recording medium of the recording/reproducing unit 33.

Also, when a user performs a mode selection operation, the control unit 50 performs an image capturing operation in the mode selected by the user.

Furthermore, the control unit 50 generates a lens control signal and a diaphragm control signal on the basis of a position signal supplied from the image capturing optical system sensor unit 13 and a detection signal supplied from the detecting unit 25, and supplies them to the driver 12. Accordingly, the focus lens 112 and the diaphragm mechanism 11b are driven by the driver 12 so that an in-focus captured image with a desired brightness can be obtained. Also, when a user performs a zoom operation, the control unit 50 generates a lens control signal and supplies it to the driver 12, so that the zoom lens 111 is driven to obtain a captured image having a desired zoom ratio.

In the image capturing apparatus 10 having such a configuration, the control unit 50 displaces at least one of the correction lens of the correction lens unit 113 and the image capturing element 21 in accordance with a motion of the image capturing apparatus 10 detected by the motion detecting unit 42. By displacing at least one of the correction lens and the image capturing element in this way, the control unit 50 performs deviation correction so that deviation does not occur in an optical image formed on the image capturing surface of the image capturing element 21 in accordance with a motion of the image capturing apparatus. That is, the control unit 50 corrects deviation of a captured image caused by a motion of the image capturing apparatus by displacing at least one of the correction lens and the image capturing element in accordance with the motion of the image capturing apparatus 10.

Figure 2:
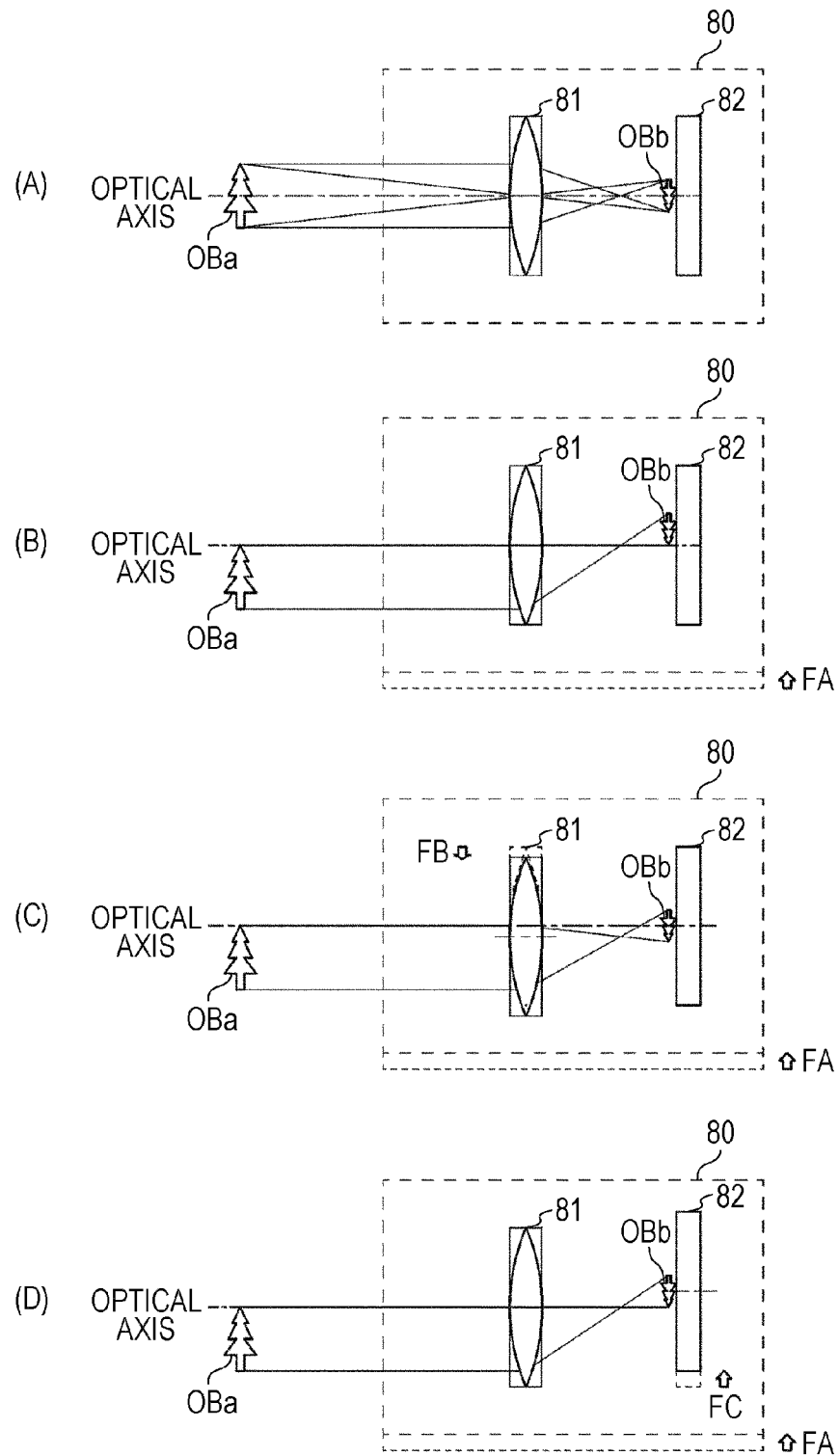
FIG. 2 includes diagrams describing relationships between a motion of an image capturing apparatus and a position of an optical image formed on an image capturing surface of an image capturing element.

FIG. 2 includes diagrams describing the relationships between a motion of an image capturing apparatus and the position of an optical image formed on the image capturing surface of an image capturing element. For example, in part (A) of FIG. 2, the position of an image capturing apparatus 80 is set so that an optical image OBb of an object OBa is at the center position of the image capturing surface of an image capturing element 82. Then, when a motion occurs in the image capturing apparatus 80 and the image capturing apparatus 80 is moved in the direction indicated by an arrow FA illustrated in part (B) of FIG. 2, the position of the optical image OBb formed on the image capturing surface moves from the center position of the image capturing surface. Here, as illustrated in part (C) of FIG. 2, when a lens unit 81 is moved in the direction indicated by an arrow FB, which is the direction opposite to the direction in which the image capturing apparatus 80 is moved, the optical image OBb can be formed at the center position of the image capturing surface. Also, as illustrated in part (D) of FIG. 2, when the image capturing element 82 is moved in the direction indicated by an arrow FC, which is the same direction as the direction in which the image capturing apparatus 80 is moved, the optical image OBb can be formed at the center position of the image capturing surface. That is, by displacing at least one of the lens unit 81 and the image capturing element 82 in accordance with a motion of the image capturing apparatus 80, deviation of a captured image caused by the motion of the image capturing apparatus 80 can be corrected.

Note that the displacement direction for displacing the lens unit 81 or the image capturing element 82 in accordance with a motion of the image capturing apparatus 80 may be a direction for correcting a movement of the optical image OBb that occurs due to a motion of the image capturing apparatus 80, and is not limited to the directions illustrated in part (C) of FIG. 2 and part (D) of FIG. 2.

In the case of displacing the lens unit, for example, the control unit 50 in FIG. 1 generates a lens control signal for displacing the correction lens of the correction lens unit 113 so as to prevent the occurrence of deviation of a captured image on the basis of a detection signal supplied from the motion detecting unit 42, and supplies it to the driver 12. The driver 12 generates a drive signal on the basis of the lens control signal and outputs it to the correction lens unit 113. The correction lens unit 113 displaces the correction lens using the actuator on the basis of the drive signal. In this way, by driving the correction lens unit 113 on the basis of the motion detection signal supplied from the motion detecting unit 42, the correction lens of the correction lens unit 113 is displaced with respect to the optical axis, thereby performing deviation correction.

Also, in the case of performing deviation correction by displacing the image capturing element 21, an actuator 21a for moving the image capturing element 21 in a direction orthogonal to the optical axis is provided in the image capturing apparatus 10, as represented by a broken line in FIG. 1. Furthermore, the control unit 50 generates a position control signal for displacing the image capturing element 21 so as to prevent the occurrence of deviation of a captured image on the basis of a detection signal supplied from the motion detecting unit 42, and supplies it to the driver 12. The driver 12 generates a drive signal on the basis of the position control signal and outputs it to the actuator 21a. The actuator 21a displaces the image capturing element 21 on the basis of the drive signal. In this way, the actuator 21a is driven on the basis of the motion detection signal supplied from the motion detecting unit 42, whereby the image capturing element 21 is displaced with respect to the optical axis, and deviation correction of the optical image formed on the image capturing surface of the image capturing element is performed.

Furthermore, when performing generation of individual images of a plurality of captured images while shifting an image capturing direction in order to generate a panoramic image from the plurality of captured images, the control unit 50 changes the correction operation start position of the correction lens and/or the image capturing element to be displaced from the position at which the optical axis is the center in the direction set according to the direction in which the image capturing direction shifts. Thus, a correction possible range of deviation correction with respect to the shift of the image capturing direction is larger than in a case where the correction operation start position is set at the position at which the optical axis is the center.

When driving the correction lens and/or the image capturing element in accordance with a motion of the image capturing apparatus from the correction operation start position, if the correction lens and/or the image capturing element can be moved without causing delay with respect to the motion of the image capturing apparatus, the control unit 50 starts exposure by setting the position at the start of the correction operation as the position at the start of exposure. Also, if the movement of the correction lens and/or the image capturing element delays with respect to the motion of the image capturing apparatus at the start of driving, the control unit 50 starts exposure after the state has changed to a state where the movement of the correction lens and/or the image capturing element follows the motion of the image capturing apparatus. Note that the period required for realizing the state where the movement of the correction lens and/or the image capturing element follows the motion of the image capturing apparatus is short, and that the position at the start of exposure is near the position at the start of the correction operation and is a position changed from the position at which the optical axis is the center in the direction set according to the direction in which the image capturing direction shifts.

During an exposure period, the control unit 50 performs a deviation correction operation of correcting deviation caused by a motion of the image capturing apparatus by moving the correction lens and/or the image capturing element in accordance with the motion of the image capturing apparatus, thereby generating a captured image without blurring caused by a motion of the image capturing apparatus.

Note that a description will be given below of the case of performing deviation correction on a motion of the image capturing apparatus by displacing the correction lens. Also, during a shift of an image capturing direction, a parallel movement and a sweep operation of the image capturing apparatus are performed. Thus, a description will be given below of the case of shifting an image capturing direction by sweeping the image capturing apparatus 10.

[1-2. Appearance of Image Capturing Apparatus]

Figure 3:
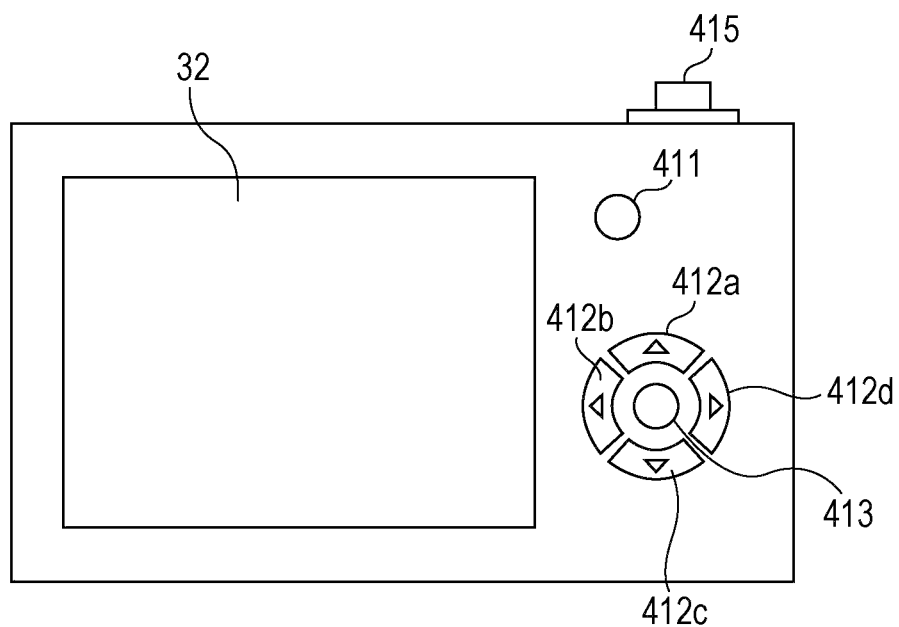
FIG. 3 is a diagram illustrating an example of an appearance of the image capturing apparatus.

FIG. 3 illustrates an example of the appearance of the image capturing apparatus 10. A display unit 32 is provided on a back surface of the casing of the image capturing apparatus 10, and an operation unit 41 is provided near the display unit 32. The operation unit 41 is constituted by a plurality of operation keys or the like. For example, a menu key 411 is an operation key for displaying a menu on the display unit 32. Direction keys 412a to 412d are operation keys that are operated to select a menu item, for example. A set key 413 provided in a center portion of the direction keys 412a to 412d is an operation key that is operated to set a selected item. Furthermore, a shutter key 415 provided on an upper surface of the casing is an operation key for performing a shutter operation. Note that the operation unit 41 illustrated in FIG. 3 is an example, and the positions and types of the keys are not limited to those in this example. Alternatively, a touch panel may be provided on the screen of the display unit 32, so that settings of various operations or execution instructions can be performed by touching a certain position of the display unit 32.

[1-3. Operation of Image Capturing Apparatus]

Figure 4:
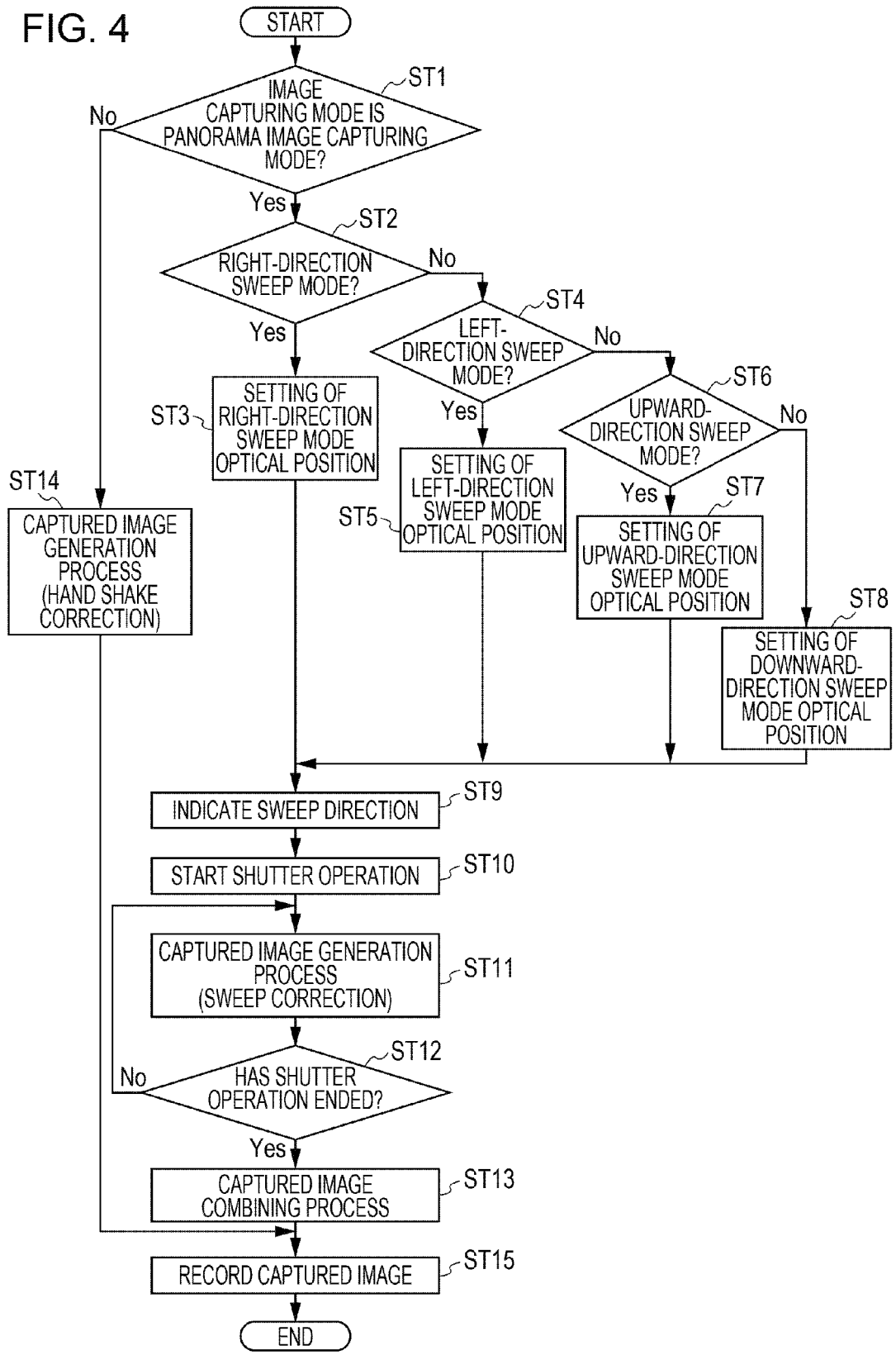
FIG. 4 is a flowchart illustrating an operation of the first embodiment.

FIG. 4 is a flowchart illustrating an operation of the first embodiment. Note that FIG. 4 illustrates a case where the image capturing apparatus 10 has a first image capturing mode of performing generation of a plurality of captured images while shifting an image capturing direction in order to generate a panoramic image from the plurality of captured images (hereinafter referred to as "panoramic image capturing mode"), and a second image capturing mode different from the first image capturing mode (hereinafter referred to as "normal image capturing mode"). Note that the second image capturing mode is an image capturing mode different from the first image capturing mode, such as an image capturing mode of generating a single captured image and an image capturing mode of overlapping a plurality of captured images of different amounts of exposure by increasing the ratio of any of the images in individual regions so as to obtain a captured image in which a person and a background have a desired brightness when image capturing is performed at night (a so-called night scene mode).

Figure 5:
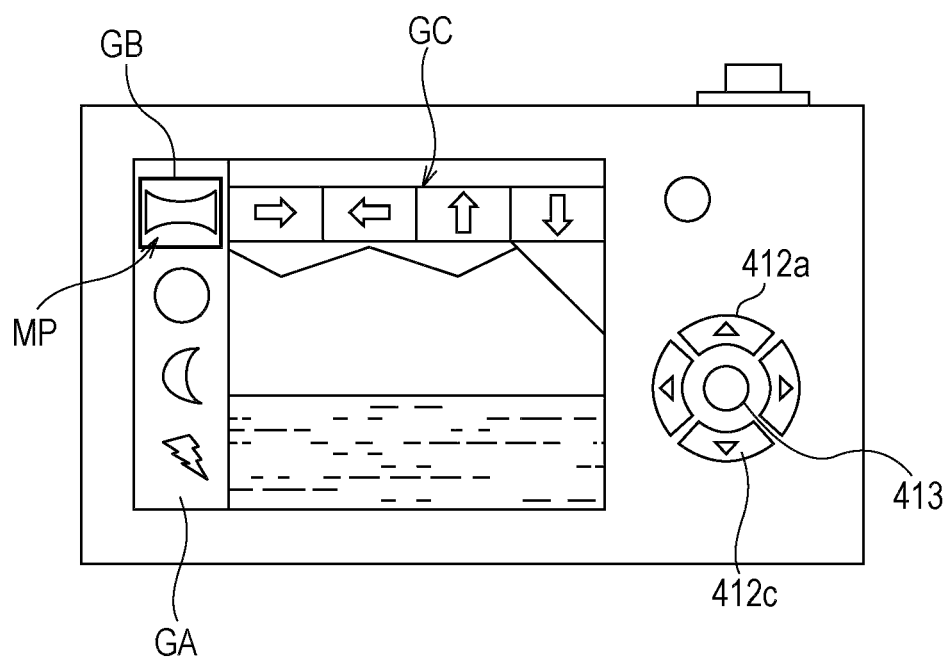
FIG. 5 is a diagram illustrating a state where display of a menu is performed.

In step ST1, the control unit 50 determines whether or not the image capturing mode is the panoramic image capturing mode. When determining that the menu key 411 of the operation unit 41 has been operated, the control unit 50 performs menu display GA on the display unit 32. FIG. 5 illustrates an example of a state where the menu display is performed on the display unit 32. After that, the control unit 50 switches the mode in accordance with an operation of the direction key 412a indicating an upward direction or the direction key 412c indicating a downward direction, so as to display the selected image capturing mode in an identifiable manner. For example, the control unit 50 provides a cursor display GB, shifts the position of the cursor display GB upward or downward in accordance with an operation of the direction key 412a or 412c, and causes the selected image capturing mode to be identifiable. Furthermore, the control unit 50 sets the image capturing mode selected when the set key 413 is operated as the image capturing mode of the image capturing apparatus 10. Here, the control unit 50 proceeds to step ST2 when the panoramic image capturing mode MP is selected as the image capturing mode, and proceeds to step ST14 when the image capturing mode is set to an image capturing mode different from the panoramic image capturing mode.

In step ST2, the control unit 50 determines whether or not the mode has been set to a right-direction sweep mode. When the panoramic image capturing mode MP is selected, the control unit 50 displays a sweep mode selection screen GC, as illustrated in FIG. 5. After that, the control unit 50 switches the sweep mode in accordance with an operation of the direction key 412b indicating the left direction or the direction key 412d indicating the right direction, and displays the selected sweep mode in an identifiable manner. For example, display of the arrow of the selected sweep mode is performed using a color, brightness, or the like different from that of the arrows of the other sweep modes, so that the selected sweep mode can be easily identified.

When the direction key 412d indicating the right direction is operated after the sweep mode selection screen GC has been displayed, the control unit 50 determines that the right-direction sweep mode is selected. When the right-direction sweep mode is selected, as illustrated in part (A) of FIG. 6, the control unit 50 performs display of the arrow indicating the right direction on the sweep mode selection screen GC in a manner different from display of the arrows indicating the other directions. Furthermore, when the direction key 412d indicating the right direction is operated in this state, the control unit 50 determines that a left-direction sweep mode is selected. When the left-direction sweep mode is selected, as illustrated in part (A) of FIG. 7, the control unit 50 performs display of the arrow indicating the left direction on the sweep mode selection screen GC in a manner different from display of the arrows of the other sweep modes.

Also, when the direction key 412d indicating the right direction is further operated, the control unit 50 determines that an upward-direction sweep mode is selected. When the upward-direction sweep mode is selected, as illustrated in part (A) of FIG. 8, the control unit 50 performs display of the arrow indicating the upward direction on the sweep mode selection screen GC in a manner different from display of the arrows of the other sweep modes. Also, when the direction key 412d indicating the right direction is further operated, the control unit 50 determines that a downward-direction sweep mode is selected. When the downward-direction sweep mode is selected, as illustrated in part (A) of FIG. 9, the control unit 50 performs display of the arrow indicating the downward direction on the sweep mode selection screen GC in a manner different from display of the arrows of the other sweep modes. Also, when the direction key 412b indicating the left direction is operated, the control unit 50 switches the sweep mode to the sweep mode positioned on the left.

In this way, the control unit 50 switches the sweep mode in accordance with an operation of the direction key 412b or 412d, and sets the sweep mode that is selected when the set key 413 is operated as the sweep mode in the panoramic image capturing mode.

If the control unit 50 determines that the right-direction sweep mode is set, the control unit 50 proceeds to step ST3. If the control unit 50 determines that another sweep mode is set, the control unit 50 proceeds to step ST4.

In step ST3, the control unit 50 performs setting of a right-direction sweep mode optical position. In the setting of a right-direction sweep mode optical position, in the case of shifting the image capturing direction of the image capturing apparatus 10 in the right direction, at least one of the lens unit and the image capturing element is displaced with respect to the optical axis in a direction set according to the direction in which the image capturing direction shifts, thereby setting a correction operation start position. By setting the correction operation start position in this way, the control unit 50 expands the correction range of deviation correction with respect to right-direction sweeping. When the image capturing mode is an image capturing mode different from the panoramic image capturing mode, the control unit 50 sets the lens unit and the image capturing element at certain positions. For example, the center positions of the lens unit and the image capturing element are set as the position of the optical axis. Also, when the image capturing mode is the panoramic image capturing mode, the control unit 50 displaces at least one of the lens unit and the image capturing element with respect to the optical axis in accordance with a sweep mode. For example, assume that, when the image capturing direction is shifted in the right direction by performing right-direction sweeping during image capturing, the image capturing apparatus 10 moves the correction lens in the left direction, thereby being able to perform correction so that the position of an object in an optical image on the image capturing surface does not move in accordance with the right-direction sweeping. In this case, the control unit 50 displaces, using the actuator 113b, the correction lens 113a of the correction lens unit 113 in the right direction from the position of the optical axis, as in part (B) of FIG. 6, on the basis of a lens control signal. Thus, the range in which corrections can be performed by moving the correction lens becomes wider than in a state before displacement. Then, the process proceeds to step ST9 with the position after the displacement being a correction operation start position. Note that, in part (B) of FIG. 6, the position indicated by a broken line AR represents the position of a correction control end of the correction lens 113a.

In step ST4, the control unit 50 determines whether or not the mode has been set to the left-direction sweep mode. If the control unit 50 determines that the mode has been set to the left-direction sweep mode, the control unit 50 proceeds to step ST5. If the control unit 50 determines that the mode has been set to another sweep mode (upward-direction sweep mode or downward-direction sweep mode), the control unit 50 proceeds to step ST6.

In step ST5, the control unit 50 performs setting of a left-direction sweep mode optical position. In the setting of a left-direction sweep mode optical position, in the case of shifting the image capturing direction of the image capturing apparatus 10 in the left direction, at least one of the lens unit and the image capturing element is displaced with respect to the optical axis in a direction set according to the direction in which the image capturing direction shifts, thereby setting a correction operation start position. By setting the correction operation start position in this way, the control unit 50 expands the correction range of deviation correction with respect to left-direction sweeping. For example, assume that, when the image capturing direction is shifted in the left direction by performing left-direction sweeping during image capturing, the image capturing apparatus 10 moves the correction lens in the right direction, thereby being able to perform corrections so that the position of an object in an optical image on the image capturing surface does not move in accordance with the left-direction sweeping. In this case, the control unit 50 displaces, using the actuator 113b, the correction lens 113a in the left direction from the center position (the position at which the optical axis is the center), as illustrated in part (B) of FIG. 7, on the basis of a lens control signal in order to expand the range in which correction can be performed by moving the correction lens. Then, the control unit 50 proceeds to step ST9 with the position after displacement being a correction operation start position.

In step ST6, the control unit 50 determines whether or not the mode has been set to the upward-direction sweep mode. If the control unit 50 determines that the mode has been set to the upward-direction sweep mode, the control unit 50 proceeds to step ST7. If the control unit 50 determines that the mode has been set to another sweep mode (downward-direction sweep mode), the control unit 50 proceeds to step ST8.

In step ST7, the control unit 50 performs setting of an upward-direction sweep mode optical position. In the setting of an upward-direction sweep mode optical position, in the case of shifting the image capturing direction of the image capturing apparatus 10 in the upward direction, at least one of the lens unit and the image capturing element is displaced with respect to the optical axis in a direction set according to the direction in which the image capturing direction shifts, thereby setting a correction operation start position. By setting the correction operation start position in this way, the control unit 50 expands the correction range of deviation correction with respect to upward-direction sweeping. For example, assume that, when the image capturing direction is shifted in the upward direction by performing upward-direction sweeping during image capturing, the image capturing apparatus 10 moves the correction lens in the downward direction, thereby being able to perform correction so that the position of an object in an optical image on the image capturing surface does not move in accordance with the upward-direction sweeping. In this case, the control unit 50 displaces, using the actuator 113b, the correction lens 113a of the correction lens unit 113 in the upward direction from the center position, as illustrated in part (B) of FIG. 8, on the basis of a lens control signal in order to expand the range in which correction can be performed by moving the correction lens. Then, the control unit 50 proceeds to step ST9 with the position after displacement being a correction operation start position.

In step ST8, the control unit 50 performs setting of a downward-direction sweep mode optical position. In the setting of a downward-direction sweep mode optical position, in the case of shifting the image capturing direction of the image capturing apparatus 10 in the downward direction, at least one of the lens unit and the image capturing element is displaced with respect to the optical axis in a direction set according to the direction in which the image capturing direction shifts, thereby setting a correction operation start position. By setting the correction operation start position in this way, the control unit 50 expands the correction range of deviation correction with respect to downward-direction sweeping. For example, assume that, when the image capturing direction is shifted in the downward direction by performing downward-direction sweeping during image capturing, the image capturing apparatus 10 moves the correction lens in the upward direction, thereby being able to perform correction so that the position of an object in an optical image on the image capturing surface does not move in accordance with the downward-direction sweeping. In this case, the control unit 50 displaces, using the actuator 113b, the correction lens 113a of the correction lens unit 113 in the downward direction from the center position, as illustrated in part (B) of FIG. 9, on the basis of a lens control signal in order to expand the range in which correction can be performed by moving the correction lens. Then, the control unit 50 proceeds to step ST9 with the position after displacement being a correction operation start position.

In step ST9, the control unit 50 performs indication of a sweep direction. The control unit 50 performs, with the display unit 32, display of a sweep indication image indicating a sweep direction so that the image capturing direction is shifted in the direction set according to the sweep mode, thereby notifying the user of the shift direction, and then proceeds to step ST10.

In step ST10, the control unit 50 starts a shutter operation and proceeds to step ST11. The start of the shutter operation is performed on the basis of an operation of the shutter key 415 or a motion detection signal. For example, the control unit 50 starts a shutter operation when detecting that the shutter key 415 is brought into a pressed state.

Also, a shutter operation can be automatically started by using a motion detection signal. For example, the control unit 50 starts a shutter operation when detecting that the orientation of the image capturing apparatus 10 has changed in the shift direction notified in step ST9 on the basis of a motion detection signal. In this way, the user can start a shutter operation only by changing the orientation of the image capturing apparatus 10 in the notified direction without operating the shutter key 415. In the case of starting a shutter operation when detecting that the shutter key 415 is brought into a pressed state, if blurring occurs in the image capturing apparatus due to an operation of the shutter key 415, the influence of the blurring may appear in a panoramic image. However, if a shutter operation is started by using a motion detection signal, it is not necessary to operate the shutter key 415, so that a panoramic image unaffected by blurring due to a shutter operation can be easily obtained.

In step ST11, the control unit 50 performs a captured image generation process. The control unit 50 drives the correction lens 113a at the correction operation start position in accordance with a motion detection signal, thereby correcting deviation caused by a sweep operation (sweep correction). The control unit 50 starts exposure, with the correction operation start position serving as the position at the start of exposure, when the correction lens 113a can be moved without causing delay with respect to a motion of the image capturing apparatus at the start of a correction operation. Also, the control unit 50 starts exposure, with the position where the movement of the correction lens 113a follows a motion of the image capturing apparatus serving as the position at the start of exposure, when the movement of the correction lens 113a delays with respect to a motion of the image capturing apparatus at the start of a correction operation. Note that the position at the start of exposure is near the correction operation start position, and is a position changed from the position at which the optical axis is the center in a direction set according to the direction in which the image capturing direction shifts. Furthermore, during an exposure period, the control unit 50 performs a deviation correction operation, thereby generating a captured image without a blur caused by a sweep operation even if the image capturing apparatus 10 is swept, and then proceeds to step ST12. Also, in the captured image generation process during the sweep operation, the control unit 50 changes the correction operation start position in the direction in which the image capturing direction shifts, thereby expanding the range in which correction can be performed. Therefore, the position at the start of exposure is changed in accordance with the change of the correction operation start position, so that the period in which deviation correction can be performed in accordance with a motion of the image capturing apparatus 10 can be made long compared to a case where the position at the start of exposure is the position at which the optical axis is the center. That is, since the period in which deviation correction can be performed in accordance with a motion of the image capturing apparatus 10 can be made long, a captured image without blurring caused by a motion of the image capturing apparatus 10 can be generated even if an exposure period is long due to a low brightness of an object.

In step ST12, the control unit 50 determines whether or not the shutter operation has ended. The control unit 50 returns to step ST11 if the control unit 50 determines that the shutter operation has not ended, and proceeds to step ST13 if the control unit 50 determines that the shutter operation has ended. Upon returning to step ST11, the control unit 50 returns the correction lens 113a to the correction operation start position between the exposure period of the captured image and the exposure period of the next captured image. After that, the control unit 50 drives the correction lens 113a again in accordance with a motion detection signal, and generates an image without a blur even if the image capturing apparatus 10 is swept.

The control unit 50 ends the shutter operation when the amount of shift reaches a preset certain amount, for example. The amount of shift can be calculated using a motion vector, for example. Alternatively, the control unit 50 may determine the amount of sweep on the basis of a motion detection signal, and may end the shutter operation when the amount of sweep reaches a certain amount. Also, in a case where a shutter operation starts through detection of a state where the shutter key 415 is pressed, the control unit 50 may end the shutter operation when detecting a state where the shutter key 415 is not pressed any more. Furthermore, in a case where a shutter operation starts by detecting that the orientation of the image capturing apparatus 10 has changed in a notified shift direction on the basis of a motion detection signal, the control unit 50 may end the shutter operation when the orientation of the image capturing apparatus 10 does not change any more in the notified shift direction.

In step ST13, the control unit 50 performs a captured image combining process. The control unit 50 controls the signal processing unit 24 to calculate motion vectors by using a plurality of captured images generated in the process in step ST11 and step ST12 in generation order. Also, the control unit 50 combines the plurality of captured images on the basis of the calculated motion vectors so that the images of the same object overlap, thereby generating a panoramic image having an image capturing range wider than that of a single captured image from the plurality of captured images, and then proceeds to step ST15.

On the other hand, if it is determined in step ST1 that the image capturing mode has been set to a mode different from the panoramic image capturing mode and the process proceeds to step ST14, the control unit 50 performs a captured image generation process. The control unit 50 drives the correction lens 113a which is at the correction operation start position, that is, at the position at which the optical axis is the center, in accordance with a motion detection signal, thereby performing correction for a hand shake during image capturing (hand shake correction). Also, the control unit 50 generates an image without a blur caused by a hand shake in accordance with an operation of the shutter key 415, and proceeds to step ST15.

Part (A) of FIG. 10 illustrates a case where the normal image capturing mode MN is selected, for example. Also, part (B) of FIG. 10 illustrates the correction operation start position of the correction lens unit 113 when the normal image capturing mode MN is set. In the normal image capturing mode, hand shake correction is performed on the basis of a motion detection signal. Here, a hand shake direction is not limited to a specific direction. Thus, the correction operation start position is set to a certain position so that hand shake correction can be performed even if a hand shake occurs in any direction. For example, the center position of a movable range of the correction lens unit 113, that is, the position at which the optical axis is the center is set as the correction operation start position. In this way, the correction operation start position is not changed, so that correction of a hand shake can be performed regardless of the direction of a hand shake. Also, the control unit 50 generates a certain number of captured images in accordance with operations of the shutter key 415.

In step ST15, the control unit 50 causes the recording/reproducing unit 33 to record the panoramic image generated in step ST13 or the captured image generated in step ST14 on the recording medium.

The control unit 50 records the captured image in the above-described manner, and ends the image capturing mode when the operation mode is changed to another mode, for example, a reproduction mode for reproducing a recorded captured image, or when an operation of ending the operation of the image capturing apparatus is performed.

As described above, in the panoramic image capturing mode, the control unit 50 changes the correction operation start position at the time of generating each captured image in a direction set according to the direction in which at least one of the lens unit and the image capturing element moves in an image capturing direction with respect to the optical axis. Also, by changing the correction operation start position, the control unit 50 sets a wide correction range of deviation correction with respect to the shift of the image capturing direction. Also, the control unit 50 moves the displaced lens unit and/or image capturing element in accordance with a motion of the image capturing apparatus. Furthermore, the position at the start of exposure changes in accordance with the change of the correction operation start position. Thus, the exposure period in which an unblurred captured image can be generated can be made long compared to a case where the change is not performed. Accordingly, the performance of deviation correction with respect to an image capturing direction is improved, and deviation correction suitable for generating a panoramic image is performed. Therefore, an unblurred captured image can be generated even if the exposure period is long, and an unblurred captured image can be generated even if the sweep speed is high. Also, at the time of generating a panoramic image, restrictions on the brightness of an object, a sweep speed, etc., are eased, so that a plurality of captured images for generating a panoramic image can be easily obtained.

Note that, in the case of performing the captured image combining process in an external apparatus, for example, a computer apparatus or the like, a plurality of captured images for generating a panoramic image are recorded on the recording medium in step ST15. Furthermore, in the case of performing the captured image combining process in an external apparatus, the image capturing apparatus 10 does not perform the captured image combining process in step ST13, so that the process in the image capturing apparatus 10 can be reduced.

[1-4. Example of Operation of Generating Panoramic Image (in the Case of Right-Direction Sweep Mode]

Next, a description will be given of an operation of generating a panoramic image, for example, a specific operation in the case of generating a panoramic image in the right-direction sweep mode.

Figure 11:
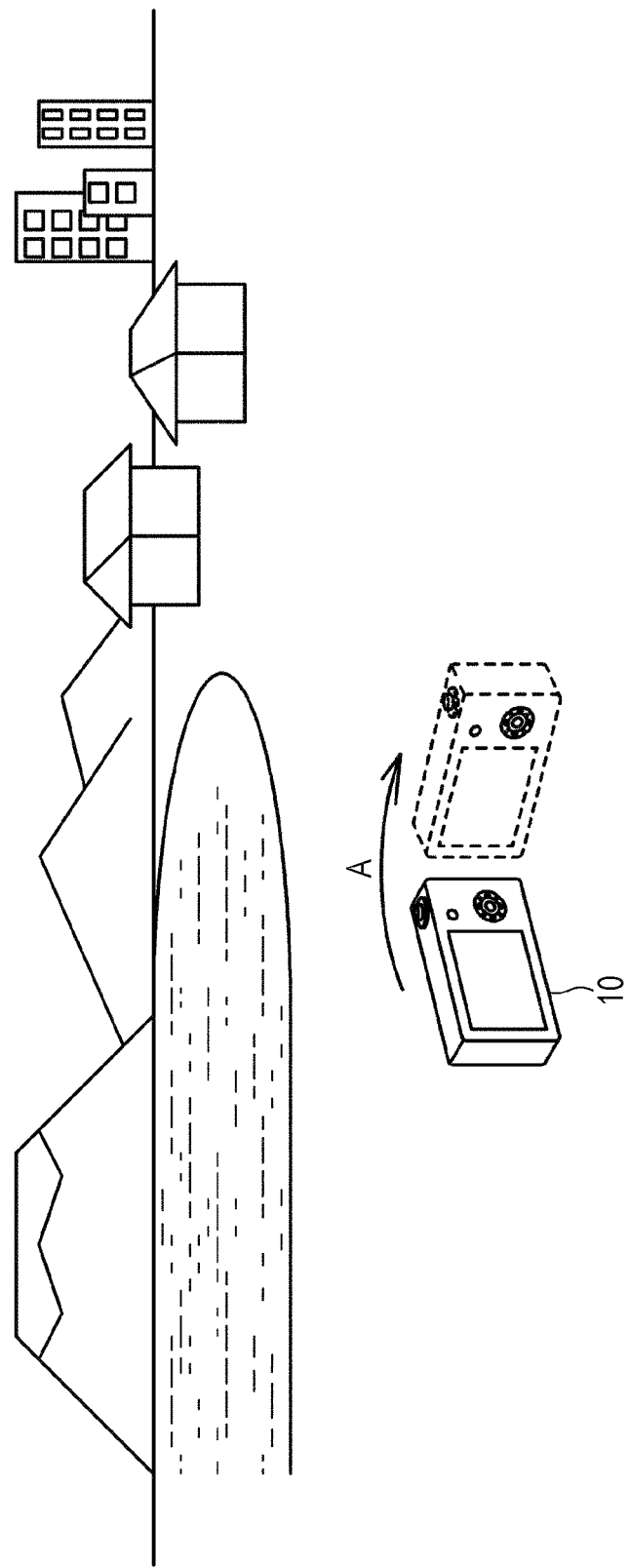
FIG. 11 is a diagram illustrating the case of generating a panoramic image using the right-direction sweep mode.

In the case of using the right-direction sweep mode of the panoramic image capturing mode as the image capturing mode of the image capturing apparatus 10, a user sweeps the orientation of the image capturing apparatus 10 (image capturing direction) in the right direction as indicated by an arrow A in FIG. 11.

FIG. 12 includes diagrams describing an operation that is performed when the right-direction sweep mode is set. In a case where the right-direction sweep mode of the panoramic image capturing mode is set as the image capturing mode, the control unit 50 displays a sweep direction indication GE that indicates a right-direction sweep operation on the display unit 32, as illustrated in part (A) of FIG. 12, thereby notifying the user of the sweep direction. Also, when the right-direction sweep mode is set, the control unit 50 changes the position of the correction lens 113a in the right direction from the center position, which is a position at which the optical axis is the center, thereby setting a correction operation start position, as illustrated in part (B) of FIG. 12. Furthermore, the control unit 50 starts deviation correction from this correction operation start position.

Figure 13:
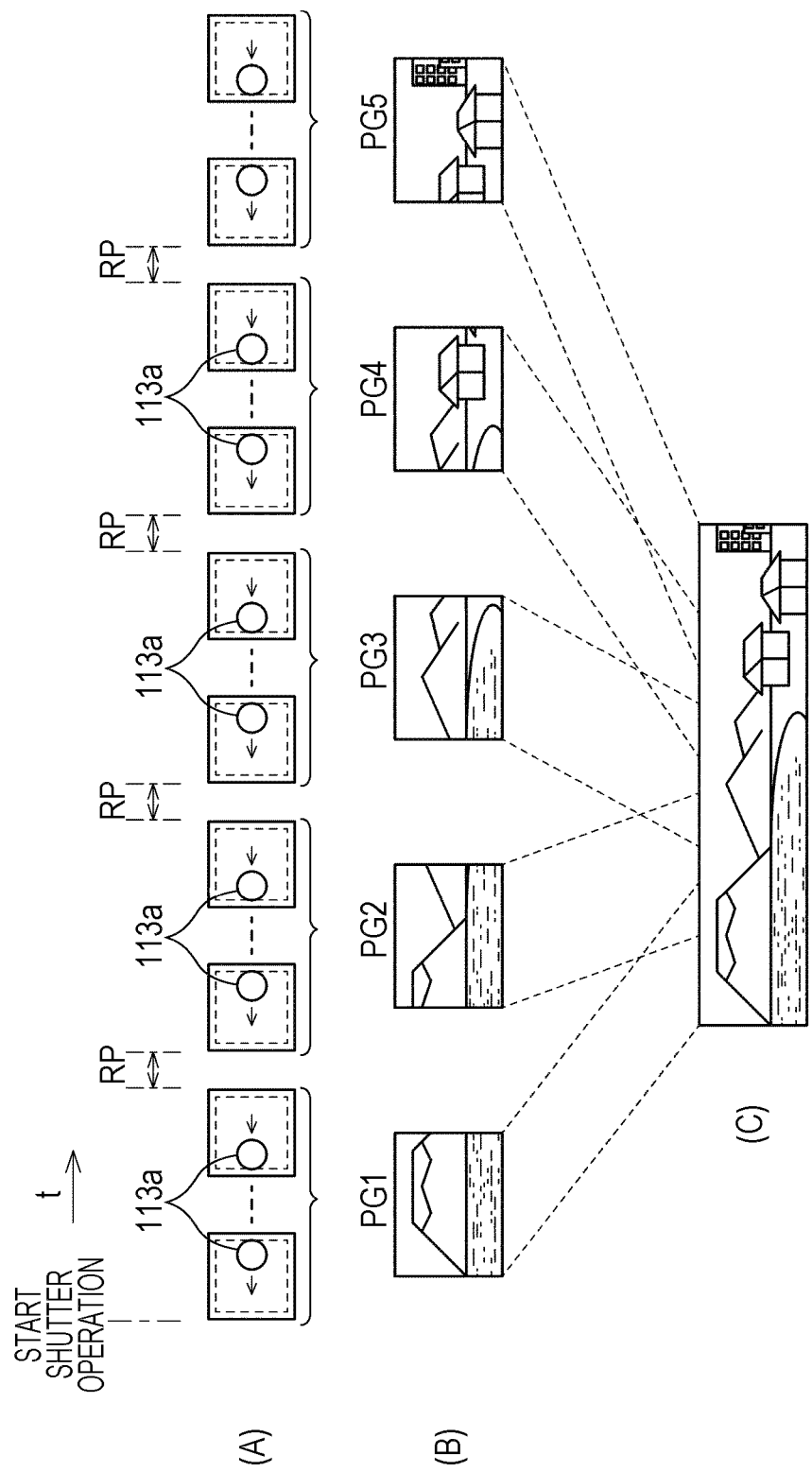
FIG. 13 includes diagrams describing a captured image generation process.

After that, the control unit 50 starts a shutter operation to perform a captured image generation process. FIG. 13 illustrates the captured image generation process. Part (A) of FIG. 13 illustrates the motions of the correction lens 113a. The control unit 50 drives the correction lens 113a at the correction operation start position in accordance with a motion detection signal. Accordingly, the correction lens 113a moves in the left direction from the correction operation start position in order to prevent deviation of an image caused by right-direction sweeping.

Also, the control unit 50 starts exposure at the start of the correction operation or after the start of the correction operation and generates a captured image, as described above. Furthermore, during the exposure period, the control unit 50 performs a deviation correction operation, drives the correction lens 113a in accordance with a motion detection signal, and moves the correction lens 113a in accordance with a motion of the image capturing apparatus, thereby correcting deviation of an optical image formed on the image capturing surface of the image capturing element 21. Accordingly, in the image capturing apparatus 10, an unblurred captured image PG1 can be generated even if right-direction sweeping is performed, as illustrated in part (B) of FIG. 13. Also, since the correction operation start position of the correction lens 113a is changed in the right direction from the center position, a correction range of deviation correction with respect to the shift of the image capturing direction is wide compared to a case where the correction operation start position is not changed. Thus, if the sweep speed is equal in cases where the correction operation start position is changed and is not changed, the exposure period in which an unblurred captured image can be generated can be made long by changing the position at the start of exposure in accordance with the change of the correction operation start position, compared to a case where the position is not changed. Also, if the exposure period is equal in cases where the position at the start of exposure is changed and where the position at the start of exposure is not changed, the sweep speed at which an unblurred captured image can be generated can be increased by changing the position at the start of exposure, compared to a case where the position is not changed.

After generating one captured image, if a shutter operation has not ended, the control unit 50 returns the correction lens 113a to the correction operation start position between the exposure period of the captured image PG1 and the exposure period of the next captured image. After that, the control unit 50 drives the correction lens 113a again from the correction operation start position in accordance with a motion detection signal. Note that, in part (A) of FIG. 13, periods in which a process of returning the correction lens 113a to the correction operation start position is performed are illustrated as periods RP. In this way, by returning the correction lens 113a to the correction operation start position and then driving it again in accordance with a motion detection signal, an unblurred captured image PG2 can be generated even if the image capturing apparatus 10 is swept.

Figure 14:
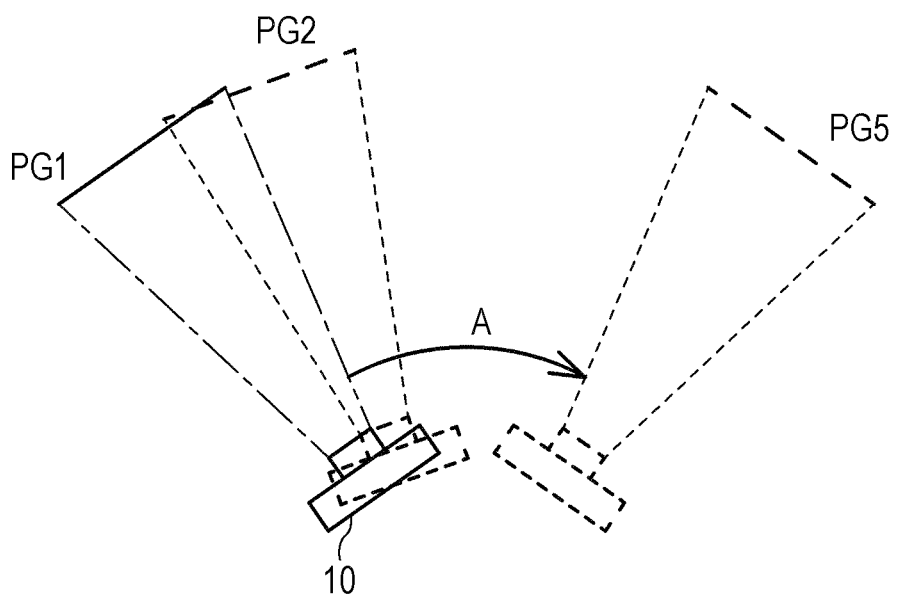
FIG. 14 is a diagram describing captured images generated in the right-direction sweep mode.

The control unit 50 repeatedly performs the above-described process, and ends the captured image generation process if the control unit 50 determines that the shutter operation has ended after generating a captured image PG5, for example. Thus, the captured images PG1 to PG5 that are sequentially generated are images obtained by sequentially switching the image capturing direction in the right direction, as illustrated in FIG. 14.

The signal processing unit 24 calculates motion vectors on the basis of the captured images PG1 to PG5 that are sequentially generated, or detects motion vectors on the basis of a motion detection signal. Also, the signal processing unit 24 aligns the captured images PG1 to PG5 on the basis of the motion vectors so that the images of objects overlap, thereby combining the captured images PG1 to PG5. Accordingly, the panoramic image illustrated in part (C) of FIG. 13 having an image capturing range wider than that of a single captured image can be generated.

In the case of shifting the image capturing direction to the right in the panoramic image capturing mode in the above-described manner, the control unit 50 displaces the correction lens 113a in the right direction as illustrated in part (B) of FIG. 12, so that the correction range of deviation correction with respect to the shift of the image capturing direction is expanded. Also, the control unit 50 displaces at least one of the lens unit and the image capturing element in accordance with a motion detected by the motion detecting sensor from this state. Accordingly, an unblurred captured image can be generated even if the exposure time is long due to a low brightness of an object, for example. Also, an unblurred captured image can be generated even if the right-direction sweep speed is high. Furthermore, restrictions on the brightness of an object, a sweep speed, etc., are eased, so that generation of a panoramic image can be easily performed.

2. Second Embodiment

Next, a second embodiment will be described. In the second embodiment, a case where a motion of an image capturing apparatus is clear will be described. In the case of performing generation of a captured image using an image capturing apparatus, image capturing using a camera platform is performed as well as image capturing in a hand-held state. Also, the image capturing direction of the image capturing apparatus may be automatically changed using a camera platform. In the case of automatically shifting the image capturing direction of the image capturing apparatus using the camera platform in this way, if the image capturing apparatus has shift control information that indicates the direction and speed of shifting (or rotating) the image capturing direction for performing image capturing, a motion of the image capturing apparatus can be determined without using a motion detection signal supplied from a motion detecting sensor. Thus, the image capturing apparatus generates a lens control signal and a position control signal on the basis of the shift control information, thereby being able to generate a plurality of captured images used for generating a panoramic image by correcting deviation caused by a motion of the image capturing apparatus, as in the first embodiment.

[2-1. Configuration of Image Capturing Apparatus]

Figure 15:
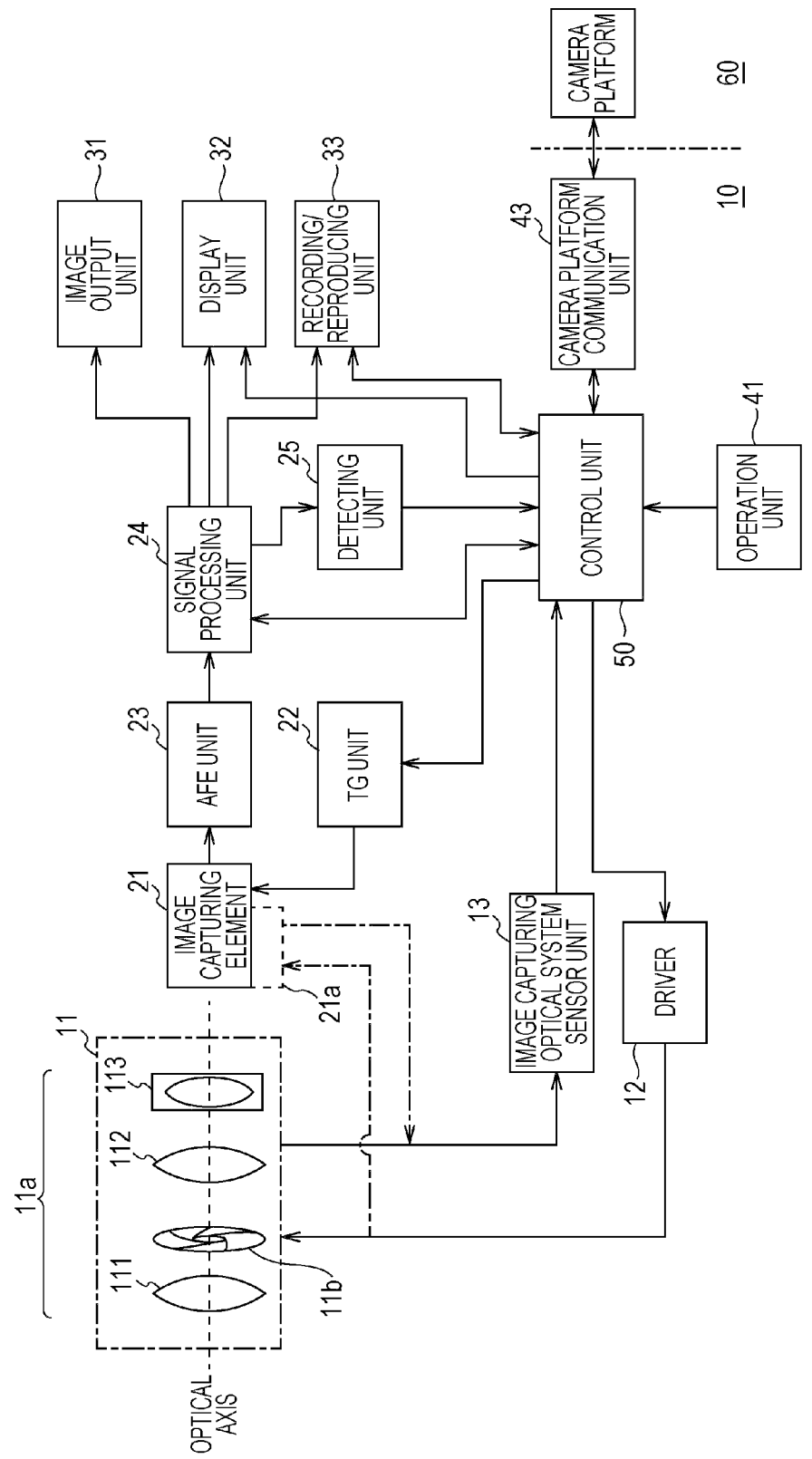
FIG. 15 is a diagram illustrating a configuration of a second embodiment.

FIG. 15 is a diagram illustrating a configuration of the second embodiment, and illustrates the case of shifting an image capturing direction using a camera platform. Note that, in FIG. 15, the parts corresponding to those in FIG. 1 are denoted by the same reference numerals.

An image capturing apparatus 10a includes the image capturing optical system block 11, the driver 12, the image capturing optical system sensor unit 13, the image capturing element 21, the timing signal generation (TG) unit 22, the analog front-end (AFE) unit 23, the signal processing unit 24, and the detecting unit 25. Furthermore, the image capturing apparatus 10a includes the image output unit 31, the display unit 32, the recording/reproducing unit 33, the operation unit 41, a camera platform communication unit 43, and a control unit 50a.

The image capturing optical system block 11 includes the lens unit 11a and the diaphragm mechanism 11b, as described above. The lens unit 11a is constituted by the zoom lens 111, the focus lens 112, and the correction lens unit 113.

The driver 12 drives the zoom lens 111, the focus lens 112, and the actuator of the correction lens unit 113 on the basis of a lens control signal supplied from the control unit 50a, which will be described below. Also, the driver 12 drives the diaphragm mechanism 11b on the basis of a diaphragm control signal supplied from the control unit 50a.

The image capturing optical system sensor unit 13 detects the lens positions of the zoom lens 111 and the focus lens 112, the displacement state of the correction lens unit 113 (equivalent to the displacement position and correction angle of the correction lens unit 113), and the setting position of the diaphragm mechanism 11b, and supplies position signals to the control unit 50a.

The image capturing element 21 converts an optical image formed on the image capturing surface by the image capturing optical system block 11 into an electric signal and outputs it to the AFE unit 23.

The TG unit 22 generates various types of drive pulses that are necessary for performing output of an electric signal representing a captured image by the image capturing element 21, electronic shutter pulses for controlling a charge storage period of the image capturing element 21, etc.

The AFE unit 23 performs a denoising process, gain control, a process of converting an analog image capturing signal on which the denoising process and gain control have been performed into a digital signal, etc., on an electric signal (image signal) output from the image capturing element 21.

The signal processing unit 24 performs camera signal pre-processing, camera signal processing, a resolution conversion process, a compression/decompression process, etc. Furthermore, in the case of generating a panoramic image in the image capturing apparatus 10a, the signal processing unit 24 calculates motion vectors using captured images, and combines a plurality of captured images using the calculated motion vectors so that the images of the same object overlap, thereby generating a panoramic image. Alternatively, information representing the shift speed and direction of an image capturing direction may be used to combine the captured images. In this case, even if motion vectors are not properly obtained, a plurality of captured images can be combined so that the images of the same object overlap.

The detecting unit 25 performs detection of a brightness level and a focus state of an object using an image capturing signal or the like supplied to the signal processing unit 24, generates a detection signal representing the brightness level and the focus state, and supplies it to the control unit 50a.

The image output unit 31 converts an image signal processed by the signal processing unit 24 into an image signal of a format compatible with an external apparatus connected to the image capturing apparatus 10a, and outputs it.

The display unit 32 displays an image that is being captured by the image capturing apparatus 10a and a captured image that has been reproduced by the recording/reproducing unit 33. Also, the display unit 32 displays a menu or the like for performing settings of the image capturing apparatus 10a.

The recording/reproducing unit 33 records an image signal and an encoded signal of a captured image output from the signal processing unit 24 on the recording medium. Also, the recording/reproducing unit 33 performs a process of reading an image signal recorded on the recording medium and supplying it to the image output unit 31 or the display unit 32, and a process of reading an encoded signal recorded on the recording medium and supplying it to the signal processing unit 24.

The operation unit 41 generates an operation signal in accordance with a user operation and supplies it to the control unit 50a.

The camera platform communication unit 43 has a configuration that enables transmission/reception of a communication signal to/from the communication unit of a camera platform 60 in a wired or wireless manner in a state where the image capturing apparatus 10a is mounted on the camera platform 60. The camera platform communication unit 43 executes communication with the image capturing apparatus 10a in accordance with a certain communication scheme.

The control unit 50a is constituted by a CPU (Central Processing Unit), a memory, etc. A program executed by the CPU and various types of data are stored in the memory. As this memory, a nonvolatile memory such as an EEPROM (Electrically Erasable and Programmable ROM) or a flash memory is used, for example. The CPU of the control unit 50a executes the program stored in the memory, and controls the individual units on the basis of the various types of data stored in the memory or an operation signal supplied from the operation unit 41 so that the image capturing apparatus 10a operates in accordance with a user operation. For example, when a user performs a shutter operation, the control unit 50a controls the operation of the TG unit 22 and so forth, thereby causing an encoded signal or the like of a still image captured at a desired shutter speed to be recorded on the recording medium of the recording/reproducing unit 33. Also, when an operation of starting recording of a moving image is performed, the control unit 50a causes an encoded signal or the like of the moving image to be recorded on the recording medium of the recording/reproducing unit 33.

Also, when a user performs a mode selection operation, the control unit 50a performs an image capturing operation in the mode selected by the user. Furthermore, the control unit 50a generates a lens control signal and a diaphragm control signal on the basis of a position signal supplied from the image capturing optical system sensor unit 13 and a detection signal supplied from the detecting unit 25, and supplies them to the driver 12. Accordingly, the focus lens 112 and the diaphragm mechanism 11b are driven by the driver 12 so that an in-focus captured image with a desired brightness can be obtained. Also, when a user performs a zoom operation, the control unit 50a generates a lens control signal and supplies it to the driver 12, so that the zoom lens 111 is driven to obtain a captured image having a desired zoom ratio.

Furthermore, when generating a plurality of captured images while shifting an image capturing direction using the camera platform 60, the control unit 50a changes, in a direction set according to the direction in which the image capturing direction shifts, the position at the start of exposure of each captured image in the correction lens and/or the image capturing element to be displaced. Also, the control unit 50a displaces at least one of the correction lens and the image capturing element in accordance with a motion of the image capturing apparatus 10a, thereby performing correction of deviation caused by the motion of the image capturing apparatus on an optical image formed on the image capturing surface of the image capturing element. Furthermore, the control unit 50a changes the correction operation start position of each captured image in the correction lens and/or the image capturing element to be displaced, thereby expanding a correction range with respect to the shift of the image capturing direction.

Additionally, in the following description, a description will be given of the case of performing deviation correction for a motion of the image capturing apparatus by displacing the correction lens.

[2-2. Configuration of Camera Platform]

Figure 16:
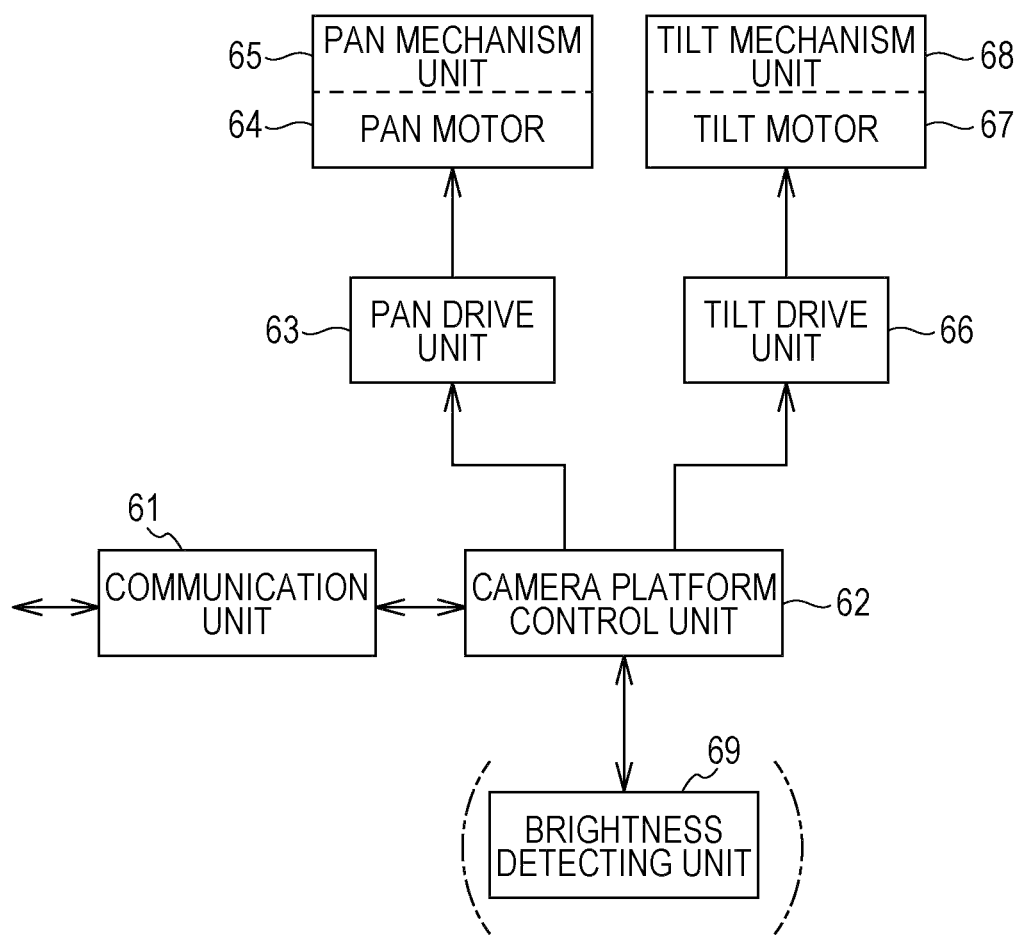
FIG. 16 is a diagram illustrating a configuration of a camera platform.

FIG. 16 is a block diagram illustrating an example of a configuration of the camera platform. The camera platform 60 has a pan/tilt mechanism, and includes, as the units corresponding thereto, a pan motor 64, a pan mechanism unit 65, a tilt motor 67, and a tilt mechanism unit 68.

A communication unit 61 is configured to correspond to the camera platform communication unit 43, and executes wired or wireless communication with the camera platform communication unit 43 of the image capturing apparatus 10a mounted on the camera platform 60 in accordance with a certain communication scheme.

A camera platform control unit 62 is configured using a CPU, a memory, and the like. The CPU of the camera platform control unit 62 executes a program stored in the memory and causes the camera platform 60 to perform a panning operation and a tilting operation. When performing a panning operation, the camera platform control unit 62 outputs a panning operation control signal to a pan drive unit 63. Also, when performing a tilting operation, the camera platform control unit 62 outputs a tilting operation control signal to a tilt drive unit 66.

The pan drive unit 63 generates a motor drive signal on the basis of the panning operation control signal and outputs it to the pan motor 64. Also, the tilt drive unit 66 generates a motor drive signal on the basis of the tilting operation control signal and outputs it to the tilt motor 67.

The pan motor 64 is provided for the pan mechanism unit 65 for giving a motion in a pan (horizontal) direction to the image capturing apparatus 10a mounted on the camera platform 60. The pan motor 64 rotates in a forward direction or a reverse direction on the basis of a motor drive signal, thereby giving a motion in a pan direction to the image capturing apparatus 10a via the pan mechanism unit 65.

The tilt motor 67 is provided for the tilt mechanism unit 68 for giving a motion in a tilt (vertical) direction to the image capturing apparatus 10a mounted on the camera platform 60. The tilt motor 67 rotates in a forward direction or a reverse direction on the basis of a motor drive signal, thereby giving a motion in a tilt direction to the image capturing apparatus 10a via the tilt mechanism unit 68.

[2-3. Operation of Image Capturing Apparatus]

Figure 17:
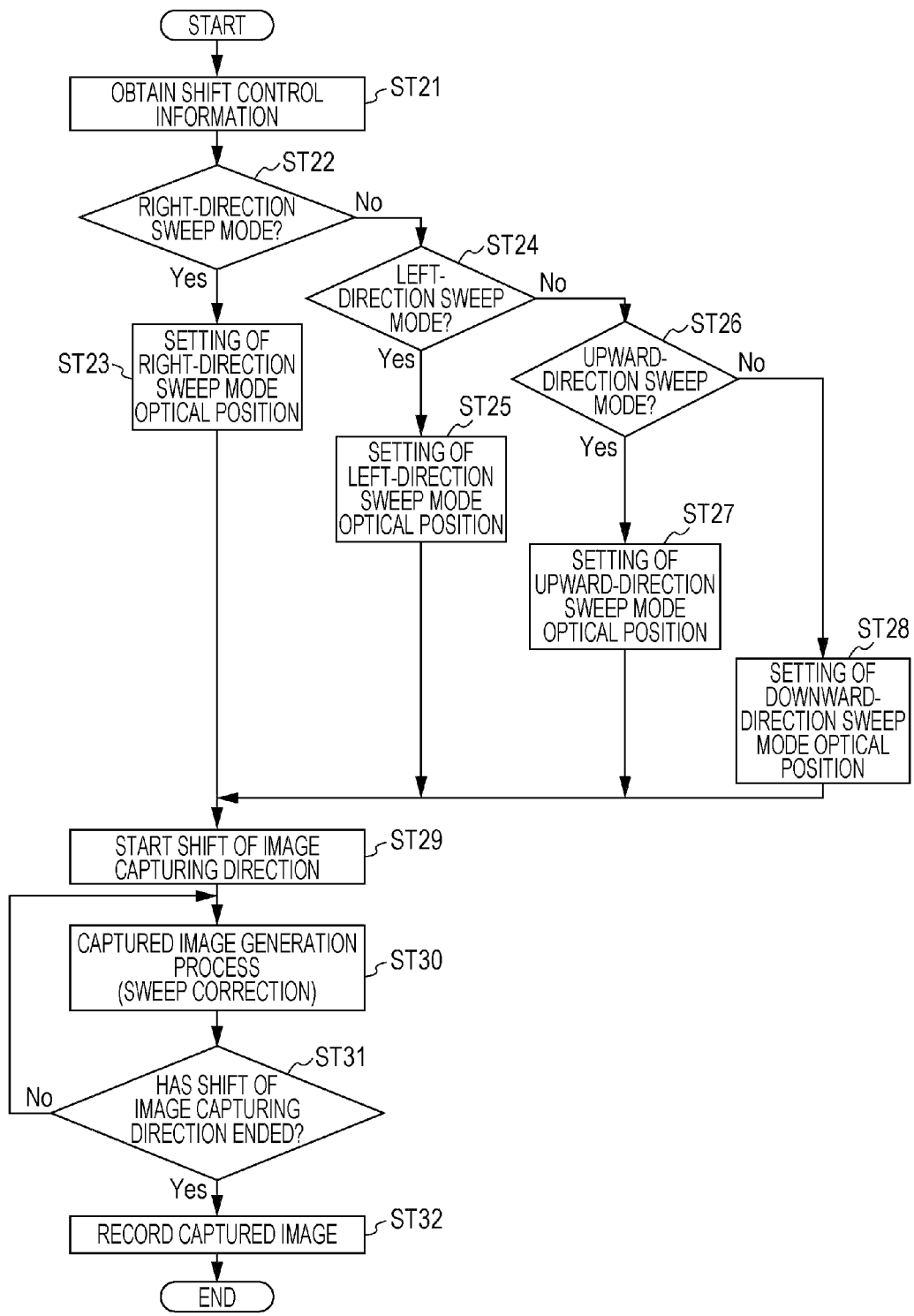
FIG. 17 is a flowchart illustrating an operation of the second embodiment.

FIG. 17 is a flowchart illustrating an operation of the second embodiment. In step ST21, the control unit 50a obtains shift control information of the image capturing apparatus 10a. The control unit 50a obtains shift control information that indicates the direction and speed of shifting (or rotating) the image capturing direction for performing image capturing, and proceeds to step ST22.

As for the shift control information, the same pieces of information are stored in advance in the image capturing apparatus 10a and the camera platform 60. Alternatively, the shift control information may be generated by the image capturing apparatus 10a in accordance with a user operation. Also, the shift control information stored in the camera platform 60 or the shift control information generated by the camera platform 60 may be obtained through communication between the image capturing apparatus 10a and the camera platform 60. Note that, in the case of generating the shift control information in the image capturing apparatus 10a, the generated shift control information is output from the image capturing apparatus 10a to the camera platform 60.

Furthermore, the speed of shifting an image capturing direction may be automatically determined by the image capturing apparatus 10a or the camera platform 60. For example, in the case of generating a captured image having a desired brightness by changing the exposure period of the image capturing element, the exposure period is long when the brightness of the captured image is low. Also, if the exposure period is long, the position of the correction lens or the image capturing element is likely to reach the correction control end in the case of performing deviation correction by displacing at least one of the correction lens and the image capturing element in accordance with a motion of the image capturing apparatus. Thus, if the exposure period is long, the speed of shifting the image capturing direction is decreased so that the position of the correction lens or the image capturing element does not reach the correction control end during the exposure period. Also, in the case of generating a captured image having a desired brightness by changing the exposure period of the image capturing element, the speed of shifting the image capturing direction can be set in accordance with a detected brightness level because the detecting unit 25 of the image capturing apparatus 10a detects the brightness level of an object. Also, as illustrated in FIG. 16, a brightness detecting unit 69 may be provided in the camera platform 60, so that the camera platform 60 or the image capturing apparatus 10a may set the speed of shifting the image capturing direction in accordance with the brightness of an object detected by the brightness detecting unit 69. In this way, the image capturing apparatus 10a and the camera platform 60 control the speed of moving the image capturing apparatus in accordance with a detected brightness.

In step ST22, the control unit 50a determines whether or not the mode has been set to the right-direction sweep mode. When shift control information represents that a right-direction sweep operation of shifting the image capturing direction in the right direction is to be performed, the control unit 50a determines that the mode has been set to the right-direction sweep mode and proceeds to step ST23. If the control unit 50a determines that the mode has been set to another sweep mode, the control unit 50a proceeds to step ST24.

In step ST23, the control unit 50a performs setting of a right-direction sweep mode optical position. In the setting of an optical position, when shifting the image capturing direction of the image capturing apparatus 10a in the right direction, at least one of the lens unit and the image capturing element is displaced in a direction set according to the direction in which the image capturing direction shifts, thereby setting a correction operation start position. By setting the correction operation start position in this way, the control unit 50a expands the correction range of deviation correction with respect to right-direction sweeping, and proceeds to step ST29.

In step ST24, the control unit 50a determines whether or not the mode has been set to the left-direction sweep mode. When shift control information represents that a left-direction sweep operation of shifting the image capturing direction in the left direction is to be performed, the control unit 50a determines that the mode has been set to the left-direction sweep mode and proceeds to step ST25. If the control unit 50a determines that the mode has been set to another sweep mode, the control unit 50a proceeds to step ST26.

In step ST25, the control unit 50a performs setting of a left-direction sweep mode optical position. In the setting of an optical position, when shifting the image capturing direction of the image capturing apparatus 10a in the left direction, at least one of the lens unit and the image capturing element is displaced in a direction set according to the direction in which the image capturing direction shifts, thereby setting a correction operation start position. By setting the correction operation start position in this way, the control unit 50a expands the correction range of deviation correction with respect to left-direction sweeping, and proceeds to step ST29.

In step ST26, the control unit 50a determines whether or not the mode has been set to the upward-direction sweep mode. When shift control information represents that an upward-direction sweep operation of shifting the image capturing direction in the upward direction is to be performed, the control unit 50a determines that the mode has been set to the upward-direction sweep mode and proceeds to step ST27. If the control unit 50a determines that the mode has been set to another sweep mode (downward-direction sweep mode), the control unit 50a proceeds to step ST28.

In step ST27, the control unit 50a performs setting of an upward-direction sweep mode optical position. In the setting of an optical position, when shifting the image capturing direction of the image capturing apparatus 10a in the upward direction, at least one of the lens unit and the image capturing element is displaced in a direction set according to the direction in which the image capturing direction shifts, thereby setting a correction operation start position. By setting the correction operation start position in this way, the control unit 50a expands the correction range of deviation correction with respect to upward-direction sweeping, and proceeds to step ST29.

In step ST28, the control unit 50a performs setting of a downward-direction sweep mode optical position. In the setting of an optical position, when shifting the image capturing direction of the image capturing apparatus 10a in the downward direction, at least one of the lens unit and the image capturing element is displaced in a direction set according to the direction in which the image capturing direction shifts, thereby setting a correction operation start position. By setting the correction operation start position in this way, the control unit 50a expands the correction range of deviation correction with respect to downward-direction sweeping, and proceeds to step ST29.

In step ST29, the control unit 50a provides an instruction to start shifting the image capturing direction. After the lens unit or the image capturing element has been set to the correction operation start position, the control unit 50a causes the camera platform 60 to start shifting the image capturing direction of the image capturing apparatus 10a in accordance with the shift direction and shift speed represented by the shift control information, and proceeds to step ST30.

In step ST30, the control unit 50a performs a captured image generation process. The control unit 50a drives the correction lens 113a at the correction operation start position in accordance with the speed of shifting the image capturing direction, thereby performing correction of deviation caused by a sweep operation (sweep correction). Note that, as described above, if the correction lens 113a can be moved without causing delay with respect to a motion of the image capturing apparatus at the start of a correction operation, the control unit 50a starts exposure with the correction operation start position serving as the position at the start of exposure. Also, if a movement of the correction lens 113a delays with respect to a motion of the image capturing apparatus at the start of the correction operation, the control unit 50a starts exposure with the position at which the movement of the correction lens 113a follows the motion of the image capturing apparatus serving as the position at the start of exposure. Furthermore, the control unit 50a performs a deviation correction operation during an exposure period, thereby generating a captured image without a blur caused by a sweep operation even if the image capturing apparatus 10a is swept by using the camera platform 60, and proceeds to step ST31. Also, the control unit 50a, in the captured image generation process during a sweep operation, the correction operation start position is changed in the direction in which the image capturing direction shifts, thereby expanding the range in which correction can be performed. Thus, the position at the start of exposure is changed in accordance with the change of the correction operation start position, and the period in which correction of deviation caused by a motion of the image capturing apparatus 10a can be performed can be made long compared to a case where the position at the start of exposure is the position at which the optical axis is the center. That is, the period in which correction of deviation caused by a motion of the image capturing apparatus 10a can be performed can be made long, and thus a captured image without blurring caused by a motion of the image capturing apparatus 10a can be generated even if the brightness of an object is low and the exposure period is long.

In step ST31, the control unit 50a determines whether or not the operation of shifting the image capturing direction has ended. The control unit 50a returns to step ST30 if the control unit 50a determines that the operation of shifting the image capturing direction has not ended, and proceeds to step ST32 if the control unit 50a determines that the operation of shifting the image capturing direction has ended. After returning to step ST30, the control unit 50a returns the correction lens 113a to the correction operation start position between the exposure period of the captured image and the exposure period of the next captured image. After that, the control unit 50a drives again the correction lens 113a in accordance with the speed of shifting the image capturing direction, thereby generating an unblurred image even if the image capturing apparatus 10a is swept.

In step ST32, the control unit 50a causes the recording/reproducing unit 33 to record the captured image generated in step ST30 on the recording medium.

As described above, in the panoramic image capturing mode, the control unit 50a changes the correction operation start position at the time of generating each captured image, at least one of the lens unit and the image capturing element with respect to the optical axis in a direction set according to the direction in which the image capturing direction shifts. Also, by changing the correction operation start position, the control unit 50a sets a wide correction range of deviation correction with respect to the shift of the image capturing direction. Also, the control unit 50a moves the displaced lens unit and/or image capturing element in accordance with a motion of the image capturing apparatus. Furthermore, the position at the start of exposure changes in accordance with the change of the correction operation start position. Thus, the exposure period in which an unblurred captured image can be generated can be made long compared to a case where the change is not performed. Accordingly, the performance of deviation correction with respect to an image capturing direction is improved, and deviation correction suitable for generating a panoramic image is performed. Therefore, an unblurred captured image can be generated even if the exposure period is long, and an unblurred captured image can be generated even if the sweep speed is high. Also, at the time of generating a panoramic image, restrictions on the brightness of an object, a sweep speed, etc., are eased, so that a plurality of captured images for generating a panoramic image can be easily obtained even in a case where the image capturing direction of the image capturing apparatus 10a is shifted using the camera platform 60. Furthermore, the configuration of the image capturing apparatus 10a is simplified because it is not necessary to detect a motion of the image capturing apparatus 10a using a motion detection sensor or the like.

Note that, in the case of performing a captured image combining process in the image capturing apparatus, a step of performing the captured image combining process may be provided, and a panoramic image generated through the captured image combining process may be recorded on a recording medium.

Also, in the case of storing the same shift control information in each of the image capturing apparatus 10a and the camera platform 60 in advance, the shift direction and shift speed of the image capturing direction are apparent in the image capturing apparatus 10a. Thus, an unblurred captured image can be generated only by generating a plurality of captured images while the image capturing direction of the image capturing apparatus 10a is being shifted by the camera platform 60.

In the case of performing communication of shift control information between the image capturing apparatus 10a and the camera platform 60, even if the shift direction or shift speed is changed, for example, the image capturing apparatus 10a and the camera platform 60 can recognize the changed shift direction or shift speed. Thus, an unblurred captured image can be generated only by generating a plurality of captured images while the image capturing direction of the image capturing apparatus 10a is being shifted by the camera platform 60.

Also, by controlling the shift speed of the image capturing direction in accordance with an exposure period, it can be prevented that the position of the correction lens or the image capturing element reaches the correction control end. Thus, an unblurred captured image can be generated even if the exposure period is changed to obtain a captured image with a desired brightness.

Note that the present invention should not be limited by the above-described embodiments of the invention. For example, any configuration capable of detecting vibration of an image capturing apparatus may be used as well as the above-described configuration using an angular velocity detecting sensor or an acceleration detecting sensor. For example, vibration of an image capturing apparatus may be detected from a captured image.

Furthermore, in the case of an image capturing apparatus having an exchangeable lens, a correction lens may be provided on the lens side, or the correction lens may be provided on the body side of the image capturing apparatus. Also, for example, a correction lens or a drive unit that drives the correction lens may be provided on the lens side, and other elements may be provided on the body side of the image capturing apparatus. Also, as described above, the image capturing element provided on the body side of the image capturing apparatus may be moved in accordance with a motion of the image capturing apparatus.

The embodiments of the present invention disclose the present invention in the form of an example, and it is apparent that those skilled in the art can achieve modifications or alternatives of the embodiments without deviating from the gist of the present invention. That is, the claims should be taken into consideration in order to determine the gist of the present invention.

INDUSTRIAL APPLICABILITY

In the image capturing apparatus and image capturing method according to the present invention, at least one of a lens unit and an image capturing element is displaced with respect to an optical axis by a drive unit. Also, at the time of performing generation of a plurality of captured images while shifting an image capturing direction in order to generate a panoramic image from the plurality of captured images, the position of the lens unit and/or the image capturing element at the start of exposure of each captured image is changed by a control unit using the drive unit in a direction set according to a direction in which the image capturing direction shifts. Furthermore, the control unit performs control to displace the displaced lens unit and/or image capturing element in accordance with a motion of the image capturing apparatus using the drive unit, so that deviation caused by the shift of the image capturing direction is corrected. In this way, deviation correction suitable for generating a panoramic image can be performed, and a plurality of captured images for generating a panoramic image can be easily obtained, which is suitable for digital cameras and the like.

REFERENCE SIGNS LIST 10, 10a . . . image capturing apparatus, 11 . . . image capturing optical system block, 11a . . . lens unit, 11b . . . diaphragm mechanism, 12 . . . driver, 13 . . . image capturing optical system sensor unit, 21 . . . image capturing element, 21a, 113b . . . actuator, 22 . . . TG unit, 23 . . . AFE unit, 24 . . . signal processing unit, 25 . . . detecting unit, 31 . . . image output unit, 32 . . . display unit, 33 . . . recording/reproducing unit, 41 . . . operation unit, 42 . . . motion detecting unit, 43 . . . camera platform communication unit, 50, 50a . . . control unit, 60 . . . camera platform, 61 communication unit, 62 . . . camera platform control unit, 63 . . . pan drive unit, 64 . . . pan motor, 65 . . . pan mechanism unit, 66 . . . tilt drive unit, 67 . . . tilt motor, 68 . . . tilt mechanism unit, 69 . . . brightness detecting unit, 111 . . . zoom lens, 112 . . . focus lens, 113 . . . correction lens unit, 113a . . . correction lens, 411 . . . menu key, 412a to 412d . . . direction key, 413 . . . set key, 415 . . . shutter key

The invention claimed is:

1. An image capturing apparatus, comprising:
   a drive device configured to displace at least one of a lens within a lens unit or an image capturing element with respect to an optical axis of the lens unit;
   a control device configured to displace, based on the drive device, the at least one of the lens or the image capturing element based on a motion of the image capturing apparatus; and
   change, based on capture of a plurality of images while an image capturing direction is shifted without stopping in order to capture each of the plurality of images to generate a panoramic image, a position of the at least one of the lens or the image capturing element from a first position to a second position, wherein the first position is a position at a start of exposure of each of the plurality of images,
   wherein the position is changed in a first direction,
   wherein the first direction is set based on a second direction in which the image capturing direction shifts, so that an optical image of an object that passes through the lens is formed substantially at a center of an image capturing surface of the image capturing element,
   wherein, based on the shifted image capturing direction, the optical axis at the second position of the at least one of the lens or the image capturing element is parallel to the optical axis at the first position prior to the change in the position of the at least one of the lens or the image capturing element,
   wherein a third position of the object in the optical image that is formed on the image capturing surface based on the second position of the at least one of the lens or the image capturing element, is substantially same as a fourth position of the object in the optical image that is formed on the image capturing surface at the first position prior to the change in the position of the at least one of the lens or the image capturing element,
   wherein a deviation, caused by the motion of the image capturing apparatus, in the optical image formed on the image capturing surface of the image capturing element during an exposure period of each of the plurality of images is corrected,
   wherein the deviation is corrected based on a correction range of deviation correction with respect to the shifted image capturing direction, and
   wherein the correction range of the deviation correction is greater than a correction operation that is set at a center position at which the optical axis is a center.

2. The image capturing apparatus according to claim 1, wherein the control device is further configured to change the position of the at least one of the lens or the image capturing element, wherein the first position is the position at the start of the exposure of each of the plurality of images shifted from the center position.

3. The image capturing apparatus according to claim 2, wherein the drive device is further configured to displace the at least one of the lens or the image capturing element within a plane vertical to the optical axis with respect to the center position.

4. The image capturing apparatus according to claim 1, wherein the control device is further configured to return the position of the at least one of the lens or the image capturing element to the first position at the start of the exposure between a first exposure period of a first captured image and a second exposure period of a second captured image that is next to the first captured image, and
   wherein the first captured image and the second captured image of the plurality of images are captured while the image capturing direction is continuously shifted.

5. The image capturing apparatus according to claim 1, wherein the control device is further configured to displace the at least one of the lens or the image capturing element at a speed that is based on the motion of the image capturing apparatus during the exposure period of one of the plurality of images.

6. The image capturing apparatus according to claim 1, further comprising a control unit configured to:
   determine a motion of the image capturing apparatus based on shift control information, wherein the shift control information is used to shift the image capturing direction of the image capturing apparatus by using a camera platform; and
   displace at least one of the lens unit and the image capturing element.

7. The image capturing apparatus according to claim 6, further comprising:
   a shift control information generating unit configured to:
   set a shift speed of the image capturing direction of the image capturing apparatus shifted by the camera platform based on a length of an exposure period so that at least one of the lens unit and the image capturing element can be displaced based on a motion of the image capturing apparatus during the exposure period of the captured image; and
   generate the shift control information based on the shift speed of the image capturing direction.

8. The image capturing apparatus according to claim 1, wherein the control device is further configured to determine a preference for one of a plurality of image capturing modes,
   wherein the plurality of image capturing modes comprises at least:
   a first image capturing mode in which the plurality of images are captured in order to generate the panoramic image, and
   a second image capturing mode that is different from the first image capturing mode, and
   wherein the control device is further configured to set, in the second image capturing mode, the position of the at least one of the lens or the image capturing element to the center position.

9. The image capturing apparatus according to claim 1, further comprising:
   a display device,
   wherein the control device is further configured to:
   display, on the display device, a menu display configured to enable selection of the second direction in which the image capturing direction is shifted to capture the plurality of images; and
   change the position of the at least one of the lens or the image capturing element, in the first direction that is set according to the second direction selected from the menu display.

10. The image capturing apparatus according to claim 9, wherein the control device is further configured to notify about the selected second direction based on the plurality of images.

11. The image capturing apparatus according to claim 1, wherein the control device is further configured to change the position of the lens.

12. The image capturing apparatus according to claim 11, wherein the control device is further configured to control the position of the lens based on the first position of the lens at the start of the exposure of each of the plurality of images,
wherein the position of the lens is position-shifted from the center position and
wherein the position of the lens is shifted in the first direction based on the second direction in which the image capturing apparatus shifts.

13. The image capturing apparatus according to claim 1, wherein the control device is further configured to change the position of the image capturing element.

14. The image capturing apparatus according to claim 13, wherein the control device is further configured to control the position of the image capturing element based on the first position of the image capturing element at the start of the exposure of each of the plurality of images,
wherein the position of the image capturing element is position-shifted from the center position, and
wherein the position of the image capturing element is shifted in the first direction based on the second direction in which the image capturing apparatus shifts.

15. The image capturing apparatus according to claim 1, wherein the control device is further configured to displace the lens in a third direction that is orthogonal to the optical axis of the lens unit.

16. The image capturing apparatus according to claim 1, wherein the control device is further configured to displace the image capturing element in a third direction that is orthogonal to the optical axis of the lens unit.

17. The image capturing apparatus according to claim 1, wherein, during the exposure of each of the plurality of images, the control device is further configured to change the position of the lens in the first direction that is opposite to the second direction.

18. An image capturing method, comprising:
displacing, with a drive device, at least one of a lens within a lens unit or an image capturing element with respect to an optical axis of the lens unit;
displacing, with a control device using the drive device, the at least one of the lens or the image capturing element based on a motion of an image capturing apparatus;
changing, with the control device, based on a capture of a plurality of images while an image capturing direction is shifted without stopping in order to capture the plurality of images to generate a panoramic image, a position of the at least one the lens or the image capturing element from a first position to a second position, wherein the first position is a position at a start of exposure of each of the plurality of images,
wherein the position is changed in a first direction,
wherein the first direction is set according to a second direction in which the image capturing direction shifts, so that an optical image of an object that passes through the lens is formed substantially at a center of an image capturing surface of the image capturing element,
wherein, based on the shifted image capturing direction, the optical axis at the second position of the at least one of the lens or the image capturing element, is parallel to the optical axis at the first position prior to the change in the position of the at least one of the lens or the image capturing element, and
wherein a third position of the object in the optical image that is formed on the image capturing surface based on the second position of the at least one of the lens or the image capturing element, is substantially same as a fourth position of the object in the optical image that is formed on the image capturing surface at the first position prior to the change in the position of the at least one of the lens or the image capturing element; and
correcting a deviation, caused by the motion of the image capturing apparatus, in the optical image formed on the image capturing surface of the image capturing element during an exposure period of each of the plurality of captured images,
wherein the deviation is corrected based on a correction range of deviation correction with respect to the shifted image capturing direction, and
wherein the correction range of the deviation correction is greater than a correction operation that is set at a center position at which the optical axis is a center.

19. The image capturing method according to claim 18, further comprising changing the position of the at least one of the lens or the image capturing element from the center position.

20. The image capturing method according to claim 19, further comprising displacing the at least one of the lens or the image capturing element within a plane vertical to the optical axis with respect to the center position.

21. The image capturing method according to claim 18, further comprising returning the position of the at least one of the lens or the image capturing element to the first position at the start of the exposure between a first exposure period of a first captured image and a second exposure period of a second captured image that is next to the first captured image,
wherein the first captured image and the second captured image of the plurality of images are captured while the image capturing direction is continuously shifted.

22. The image capturing method according to claim 18, further comprising displacing the at least one of the lens or the image capturing element at a speed that is based on the motion of the image capturing apparatus during the exposure period of one of the plurality of images.

23. A non-transitory computer-readable storage medium having stored thereon, computer-executable instructions for causing a computer to execute operations, the operations comprising:
displacing, with a drive device, at least one of a lens within a lens unit or an image capturing element with respect to an optical axis of the lens unit;
displacing, with a control device using the drive device, the at least one of the lens or the image capturing element based on a motion of an image capturing apparatus;
changing, with the control device, based on a capture of a plurality of images while an image capturing direction is shifted without stopping in order to capture the plurality of images to generate a panoramic image, a position of the at least one the lens or the image capturing element from a first position to a second position, wherein the first position is a position at a start of exposure of each of the plurality of captured images,
wherein the position is changed in a first direction, wherein the first direction is set according to a second direction in which the image capturing direction shifts, so that an optical image of an object that passes through the lens is formed substantially at a center of an image capturing surface of the image capturing element, wherein, based on the shifted image capturing direction, the optical axis at the second position of the at least one of the lens or the image capturing element, is parallel to the optical axis at the first position prior to the change in the position of the at least one of the lens or the image capturing element, and wherein a third position of the object in the optical image that is formed on the image capturing surface based on the second position of the at least one of the lens or the image capturing element, is substantially same as a fourth position of the object in the optical image that is formed on the image capturing surface at the first position prior to the change in the position of the at least one of the lens or the image capturing element; and correcting a deviation, caused by the motion of the image capturing apparatus, in the optical image formed on the image capturing surface of the image capturing element during an exposure period of each of the plurality of captured images, wherein the deviation is corrected based on a correction range of deviation correction with respect to the shifted image capturing direction, and wherein the correction range of the deviation correction is greater than a correction operation that is set at a center position at which the optical axis is a center.

24. The non-transitory computer-readable storage medium according to claim 23, further comprising changing the position of the at least one of the lens or the image capturing element from the center position.

25. The non-transitory computer-readable storage medium according to claim 24, further comprising displacing the at least one of the lens or the image capturing element within a plane vertical to the optical axis with respect to the center position.

26. The non-transitory computer-readable storage medium according to claim 23, further comprising returning the position of the at least one of the lens or the image capturing element to the first position at the start of the exposure between a first exposure period of a first captured image and a second exposure period of a second captured image that is next to the first captured image, wherein the first captured image and the second captured image of the plurality of images are captured while the image capturing direction is continuously shifted.

27. The non-transitory computer-readable storage medium according to claim 23, further comprising displacing the at least one of the lens or the image capturing element at a speed that is based on the motion of the image capturing apparatus during the exposure period of one of the plurality of images.

* * * * *